(12) United States Patent
Nishiyama

(10) Patent No.: US 11,415,991 B2
(45) Date of Patent: Aug. 16, 2022

(54) IMAGE GENERATING DEVICE AND IMAGE GENERATING METHOD

(71) Applicant: Furuno Electric Co., Ltd., Nishinomiya (JP)

(72) Inventor: Koji Nishiyama, Nishinomiya (JP)

(73) Assignee: Furuno Electric Co., Ltd., Nishinomiya (JP)

(*) Notice: Subject to any disclaimer, the term of this patent is extended or adjusted under 35 U.S.C. 154(b) by 334 days.

(21) Appl. No.: 16/690,904

(22) Filed: Nov. 21, 2019

(65) Prior Publication Data

US 2020/0089234 A1 Mar. 19, 2020

Related U.S. Application Data

(63) Continuation-in-part of application No. PCT/JP2018/018646, filed on May 15, 2018.

(30) Foreign Application Priority Data

May 24, 2017 (JP) .............................. JP2017-103149

(51) Int. Cl.
*G05D 1/02* (2020.01)
*G06T 11/20* (2006.01)
(Continued)

(52) U.S. Cl.
CPC .......... *G05D 1/0206* (2013.01); *G06T 11/206* (2013.01); *G06T 15/04* (2013.01); *G06T 19/006* (2013.01); *H04N 7/18* (2013.01)

(58) Field of Classification Search
None
See application file for complete search history.

(56) References Cited

U.S. PATENT DOCUMENTS

2004/0202381 A1* 10/2004 Kitajima .............. H04N 5/3572
  348/222.1
2012/0056992 A1* 3/2012 Kuroda ................ H04N 13/156
  348/46
(Continued)

FOREIGN PATENT DOCUMENTS

JP 06-301897 A 10/1994
JP H0887232 A 4/1996
(Continued)

OTHER PUBLICATIONS

Valero Arnau, 3D Augmented Reality Mobile Application Prototype for Visual Planning Support, 2011, Master's of Science Thesis in Geoinformatics, Royal Institute of Technology, Stockholm, Sweden (Year: 2011).*

(Continued)

*Primary Examiner* — Michael J Cobb
(74) *Attorney, Agent, or Firm* — Alleman Hall Creasman & Tuttle LLP

(57) ABSTRACT

The present disclosure provides an image generating device configured to acquire an image captured by an imaging device to be installed in a water-surface movable body, place a virtual camera based on positional information and posture information, place additional display information as a 3D virtual reality object, place a virtual projection screen subdivided by a mesh distorted in the opposite direction of lens distortion in the captured image, convert vertexes of the virtual reality object and of the mesh faces by a vertex shader based on a position and a direction of the virtual camera into positions in a 2D virtual screen, place image pieces of the captured image to the corresponding mesh by a pixel shader based on the positions of the vertexes in the virtual screen, and generate a synthesized image where a (Continued)

graphic rendering the virtual reality object is synthesized with the captured image.

20 Claims, 13 Drawing Sheets

(51) Int. Cl.
*G06T 15/04* (2011.01)
*G06T 19/00* (2011.01)
*H04N 7/18* (2006.01)

(56) References Cited

U.S. PATENT DOCUMENTS

| | | | |
|---|---|---|---|
| 2012/0229460 A1* | 9/2012 | Fortin | G06T 1/20 345/419 |
| 2015/0054841 A1* | 2/2015 | Cornell | G06T 15/005 345/581 |
| 2015/0199847 A1* | 7/2015 | Johnson | G02B 27/017 345/633 |
| 2015/0350552 A1 | 12/2015 | Pryszo et al. | |
| 2016/0307363 A1* | 10/2016 | Zou | G06T 15/005 |
| 2017/0061631 A1* | 3/2017 | Karasudani | G06F 3/017 |
| 2017/0193687 A1* | 7/2017 | Lo | G06T 5/006 |
| 2018/0061122 A1* | 3/2018 | Clarberg | G06T 1/60 |

FOREIGN PATENT DOCUMENTS

| | | | |
|---|---|---|---|
| JP | 2010003274 A | | 1/2010 |
| JP | 2011217057 A | * 10/2011 | ........... G06T 15/405 |
| JP | 2011227864 A | | 11/2011 |
| JP | 2015215278 A | | 12/2015 |

OTHER PUBLICATIONS

Wisernig, E. et al., "Augmented Reality Visualization for Sailboats (ARVS)," Proceedings of 2015 International Conference on Cyberworlds, Oct. 7, 2015, Visby, Sweden, 8 pages.

European Patent Office, Extended European Search Report Issued in Application No. 18805441.5, dated Feb. 11, 2021, Germany, 8 pages.

* cited by examiner

IMAGE GENERATING DEVICE AND IMAGE GENERATING METHOD

CROSS-REFERENCE TO RELATED APPLICATION

This application is a continuation-in-part of PCT International Application PCT/JP2018/018646, which was filed on May 15, 2018, and which claims priority to Japanese Patent Application Ser. No. 2017-103149 filed on May 24, 2017, the entire disclosures of each of which are herein incorporated by reference for all purposes.

TECHNICAL FIELD

The present disclosure relates to an image generating device and an image generating method. In detail, the present disclosure relates to an image generating device and an image generating method which generate an image indicative of a situation around a water-surface movable body.

BACKGROUND

For example, this kind of image generating device is disclosed in Patent Document 1. The image generating device of Patent Document 1 includes a camera, an imaging data receiving part, a position acquiring part, an image generating part, a target object display item generating part, and a display unit, and is configured to perform geo-referencing of the image stream from the camera.

In Patent Document 1, the imaging data receiving part receives the stream image data captured by the camera of a ship. The position acquiring part acquires the position of a target object around the ship (another ship etc.). The image generating part generates an image to be displayed on the display unit based on the image of the stream image data. The image supports the position and the view of the camera. The target object display item generating part generates a target object display item indicative of the target object at a point on the image. The display is configured to display the image, and the target object display item placed at the point on the image.

The image generating part generates the image by projecting the image on a three-dimensional virtual space in which points correspond to the points on the image, and the environment around the water-surface movable body is indicated. Further, the target object display item generating part generates the target object display item based on positional information on the target object, and the points of the three-dimensional virtual space.

REFERENCE DOCUMENT OF CONVENTIONAL ART

Patent Document

Patent Document 1 US2015/0350552A1

Meanwhile, lens distortion generally arises in image data captured by the camera. In particular, when imaging the situation around a ship, it is possible to use a wide-angle lens in order to obtain a captured image of an extensive view, but, in that case, the distortion of the image becomes stronger. Therefore, if a synthesized image obtained by simply synthesizing the image with the target object display items is displayed on a display unit, it becomes an unnatural image, and it may give uncomfortableness to the user who looked at this synthesized image. In the configuration of Patent Document 1, there is still room for an improvement in terms of such an issue.

The present disclosure is made in view of the above situations, and one purpose thereof is to efficiently generate high-quality synthesized image with less visual uncomfortableness to realize an excellent extended realistic indication.

SUMMARY

The problem to be solved by the present disclosure is as described above, and means to solve the problem and the effect thereof is described below.

According to the first aspect of the present disclosure, an image generating device with the following configuration is provided. That is, the image generating device, comprising processing circuitry configured to, acquire an image captured by an imaging device to be installed in a water-surface movable body, acquire positional information indicative of a position of the water-surface movable body, acquire posture information indicative of a posture of the water-surface movable body, acquire additional display information including information indicative of positions of one or more locations, place a virtual camera in a three-dimensional virtual space based on the positional information and the posture information, place at least one of the additional display information in the three-dimensional virtual space as a three-dimensional virtual reality object, place a virtual projection screen, create a mesh subdividing the projection screen, the mesh being distorted in the opposite direction of lens distortion caused in the captured image, convert vertexes of the virtual reality object and vertexes of the mesh faces by a vertex shader based on a position and a direction of the virtual camera into positions in a two-dimensional virtual screen that is a perspective projection plane, place image pieces that are subdivisions of the captured image to the corresponding mesh by a pixel shader based on the positions of the vertexes in the virtual screen, and generate a synthesized image where a graphic rendering the virtual reality object is synthesized with the captured image.

According to this configuration, the synthesized virtual reality image can be obtained by superimposing the graphic which three-dimensionally expresses the position etc. of the additional display information on the captured image based on the position and the posture of the water-surface movable body. Moreover, since the captured image is synthesized with the three-dimensional computer graphic in the state where the lens distortion caused in the captured image is corrected, the uncomfortableness when synthesized can be reduced. Further, since the mesh distorted in the opposite direction of the lens distortion is placed in the three-dimensional virtual space, the vertexes of the mesh are converted into the positions in the virtual screen, and the image pieces obtained by subdividing the image of the imaging device are placed on the corresponding mesh, the lens distortion can be appropriately corrected. Moreover, since the perspective projection in consideration of the correction of the lens distortion is performed by the vertex shader in a stage of vertex coordinate data, and raster data of the captured image is then placed by the pixel shader, the deformation of the raster data may be performed only once. Therefore, degradation of image quality can be prevented, and the speed of the processing can be largely increased, as compared with the case where the processing to deform the raster data of the captured image is performed individually for the correction of the lens distortion and the perspective projection.

In the image generating device, the additional display information may include at least any of another water-surface movable body, a landmark, a scheduled route, a route trace, a way point, a stopping location, a destination, an ocean space where a school of fish is detected, a foul water area, a traveling prohibited area, a buoy, and a virtual buoy.

According to the second aspect of the present disclosure, a method of generating an image as follows is provided. That is, the method includes acquiring an image captured by an imaging device to be installed in a water-surface movable body; acquiring positional information indicative of a position of the water-surface movable body, acquiring posture information indicative of a posture of the water-surface movable body; acquiring additional display information including information indicative of positions of one or more locations, placing a virtual camera in a three-dimensional virtual space based on the positional information and the posture information, placing at least one of the additional display information in the three-dimensional virtual space as a three-dimensional virtual reality object, placing a virtual projection screen, creating a mesh subdividing the projection screen, the mesh being distorted in the opposite direction of lens distortion caused in the captured image, converting vertexes of the virtual reality object and vertexes of the mesh faces by a vertex shader based on a position and a direction of the virtual camera into positions in a two-dimensional virtual screen that is a perspective projection plane, placing image pieces that are subdivisions of the captured image to the corresponding mesh by a pixel shader based on the positions of the vertexes in the virtual screen, and generating a synthesized image where a graphic rendering the virtual reality object is synthesized with

DETAILED DESCRIPTION

Figure 1:
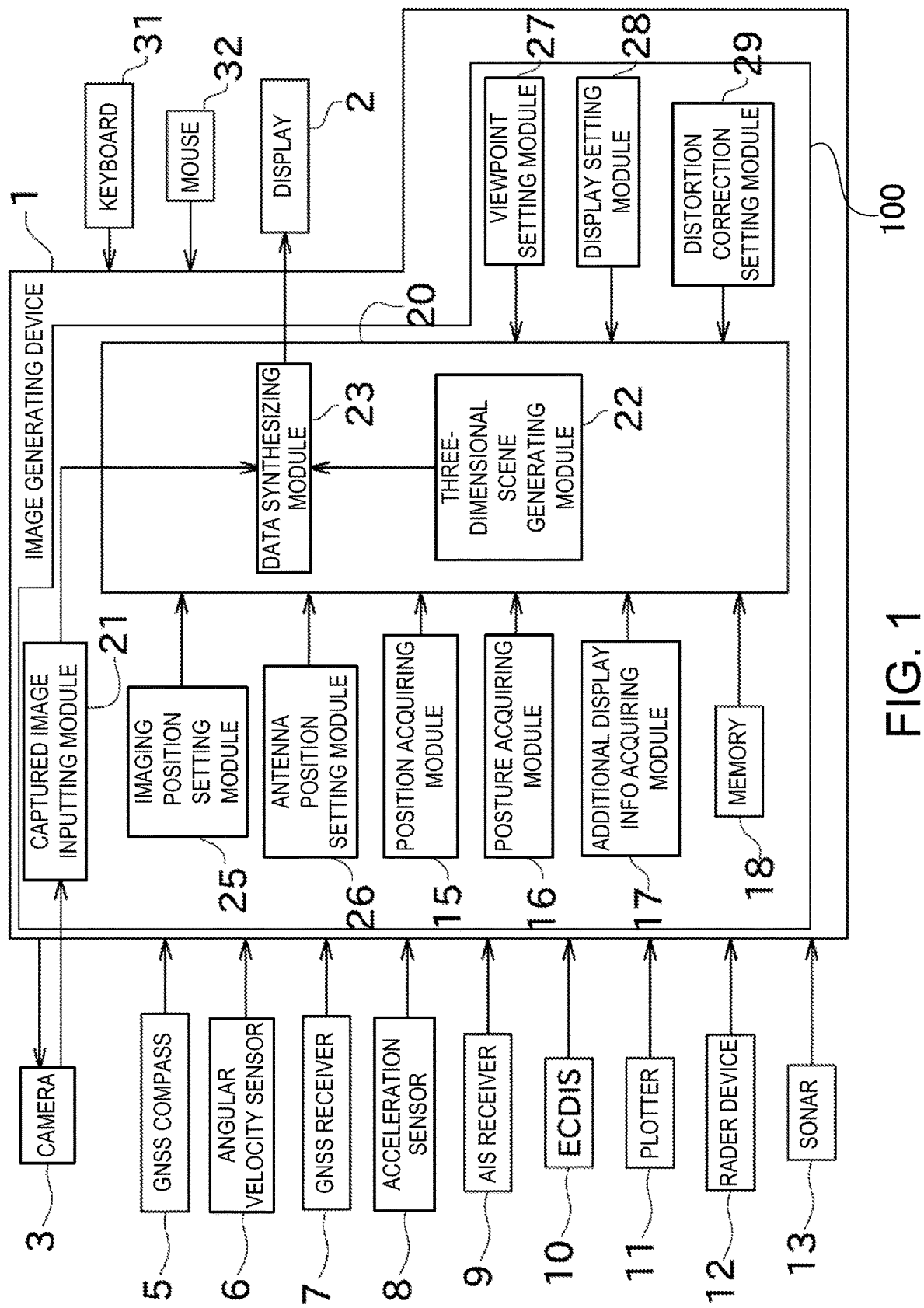
FIG. 1 is a block diagram illustrating the entire configuration of an image generating device according to one embodiment of the present disclosure.
Figure 2:
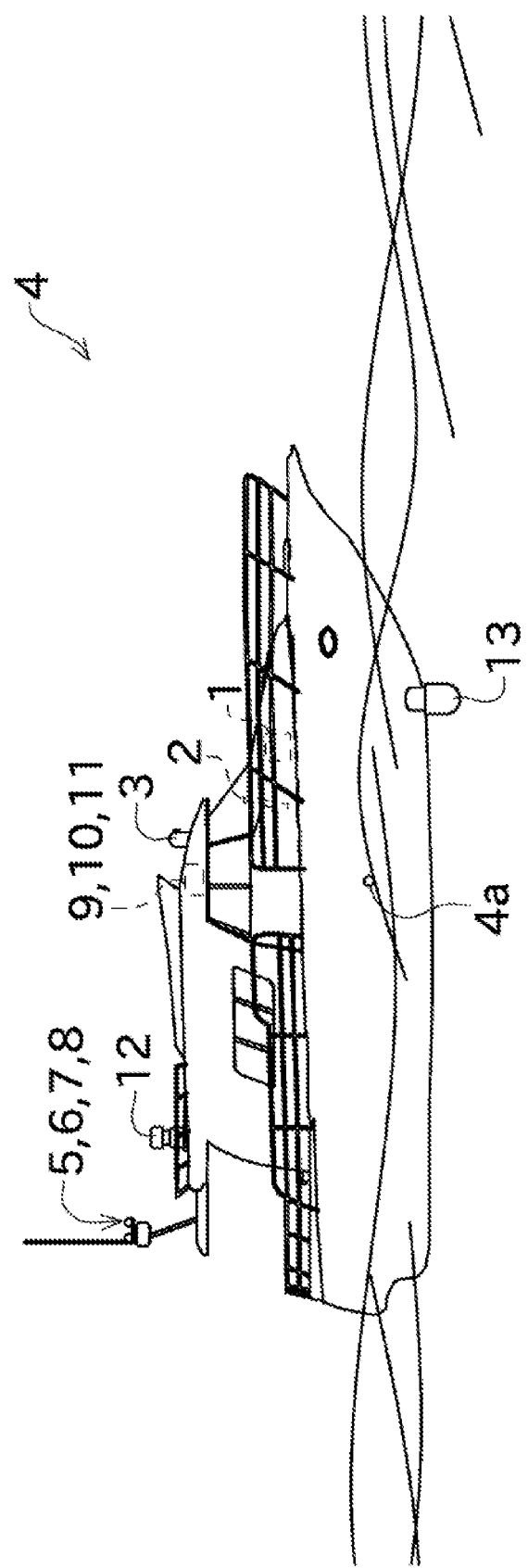
FIG. 2 is a side view illustrating various kinds of instruments mounted on a ship.

Next, one embodiment of the present disclosure is described with reference to the drawings. FIG. 1 is a block diagram illustrating the entire configuration of an image generating device 1 according to one embodiment of the present disclosure. FIG. 2 is a side view illustrating various kinds of instruments mounted on a ship 4.

The image generating device 1 illustrated in FIG. 1 may be a device which is mounted on the ship (water-surface movable body) 4 as illustrated, for example, in FIG. 2, and may generate an image expressing the situation around the ship 4 in virtual reality based on the image captured by a camera (imaging device) 3. The image generated by the image generating device 1 may be displayed on a display unit 2.

The display unit 2 may be configured as, for example, a display unit for a navigation assisting device to which a ship operator who operates the ship 4 refers. However, the display unit 2 is not limited to the above configuration, and, for example, it may be a display unit for a portable computer which is carried by a ship operator's assistant who monitors the surrounding situation from the ship 4, a display unit for a passenger to watch in the cabin of the ship 4, or a display part for a head mounted display, such as a wearable glass, worn by a passenger.

The image generating device 1 may generate a synthesized image which is an output image to the display unit 2 by synthesizing the image around the ship 4 captured by the camera 3 installed in the ship 4, and graphics which expresses additional display information on the perimeter of the ship 4 in virtual reality (as will be described in detail later).

Next, mainly referring to FIG. 1, the camera 3 and various kinds of ship instruments which may be electrically connected to the image generating device 1 are described.

The camera 3 may be configured as a wide-angle video camera which images the perimeter of the ship 4. This camera 3 may have a live output function, capable of generating video data (image data) as the imaged result on real time, and outputting it to the image generating device 1. As illustrated in FIG. 2, the camera 3 may be installed in the ship 4 so that an imaging direction becomes horizontally forward of the hull.

The camera 3 may be attached to the ship 4 through a rotating mechanism (not illustrated) and, therefore, the imaging direction can be changed in a given angle range on the basis of the hull of the ship 4 by inputting a signal for instructing pan/tilt from the image generating device 1. Moreover, since the height and the posture of the ship 4 variously change due to waves etc., the height of the camera 3 may change in connection with the change, and the posture (imaging direction) may also change three-dimensionally.

The image generating device 1 of this embodiment may be electrically connected to, in addition to the camera 3, a GNSS compass (a direction sensor, a posture sensor) 5, an angular velocity sensor 6, a GNSS receiver 7, an acceleration sensor 8, an AIS receiver 9, an ECDIS 10, a plotter 11, a radar device 12, and a sonar 13, etc. as the ship instrument.

The GNSS compass 5 may be provided with a plurality of GNSS antennas (positioning antenna) fixed to the ship 4.

The GNSS compass 5 may calculate spatial relationships of the GNSS antennas based on radio waves received from positioning satellites. Particularly, the GNSS compass 5 of this embodiment may be configured to obtain the spatial relationships of the GNSS antennas based on phase differences of carrier phases of the radio waves received by the respective GNSS antennas (since this processing is known, detailed description thereof is omitted). Therefore, a bow direction of the ship 4 can be acquired with sufficient accuracy.

The GNSS compass 5 may acquire the posture of the ship 4 three-dimensionally. In other words, the GNSS compass 5 may detect a roll angle and a pitch angle of the ship 4, as well as the bow direction (i.e., yaw angle of the ship 4). The posture information on the ship 4 acquired by the GNSS compass 5 may be outputted to a posture acquiring module 16 of the image generating device 1, and other ship instruments utilizing the posture information.

The angular velocity sensor 6 may be, for example, comprised of a known oscillating gyroscope sensor, which is capable of detecting a yaw angular velocity, a roll angular velocity, and a pitch angular velocity of the ship 4 at a cycle shorter than a posture detection interval of the GNSS compass 5 (e.g., 1 second). By using both an angle detected by the GNSS compass 5 and an integrated value of the angular velocity detected by the angular velocity sensor 6, the posture of the ship 4 can be acquired at a time interval shorter than the case where only the GNSS compass 5 is used. Moreover, the angular velocity sensor 6 may function as an alternative for acquiring the posture information, when the radio wave from the positioning satellite is interrupted with an obstacle, such as a bridge, and the posture becomes undetectable by the GNSS compass 5.

The GNSS receiver 7 may find the position of the ship 4 (in detail, a latitude, a longitude, and a height of the GNSS antenna) based on the radio waves which the GNSS antennas received from the positioning satellites. The GNSS receiver 7 may output the acquired positional information to a position acquiring module 15 of the image generating device 1, and/or other ship instruments utilizing the positional information.

The acceleration sensor 8 may be configured, for example, as a known capacitance detection type sensor, which is capable of detecting accelerations about the yaw axis, the roll axis, and the pitch axis of the ship 4 at a cycle shorter than a position detection interval of the GNSS receiver 7 (e.g., 1 second). By using both the position detected by the GNSS receiver 7, and a double integrated value of the acceleration detected by the acceleration sensor 8, the position of the ship 4 can be acquired at a time interval shorter than the case where only the GNSS receiver 7 is used. Moreover, the acceleration sensor 8 may function as an alternative for acquiring the positional information, when the radio wave from the positioning satellite is interrupted, and the detection of the position is impossible by the GNSS receiver 7.

In this embodiment, as illustrated in FIG. 2, the angular velocity sensor 6, the GNSS receiver 7, and the acceleration sensor 8 may be built in the GNSS compass 5. However, some or all of the angular velocity sensor 6, the GNSS receiver 7, and the acceleration sensor 8 may be provided independently from the GNSS compass 5.

The AIS receiver 9 may receive AIS information transmitted from another ship, a land station, etc. The AIS information may include various information, such as a position (latitude and longitude) of another ship which travels around the ship 4, a length and a width of another ship, and a type and identifying information of another ship, a ship speed, a course, a destination of another ship, and a position and identifying information of a landmark.

The ECDIS 10 may acquire the positional information on the ship 4 from the GNSS receiver 7 and output the information on the perimeter of the ship 4 to the image generating device 1 based on electronic nautical chart information stored beforehand.

The plotter 11 may generate information on a traveling trail of the ship 4 by continuously acquiring the position of the ship 4 from the GNSS receiver 7. Moreover, by allowing a user to set a plurality of waypoints (points through which the ship 4 is scheduled to pass), the plotter 11 can generate a scheduled route by sequentially connecting these waypoints.

The radar device 12 may detect a target object, such as another ship, which exists around the ship 4. Moreover, the radar device 12 may have a known target tracking function (Target Tracking, TT) which acquires and tracks the target object, and may find a position and a velocity vector (TT information) of the target object.

The sonar 13 may detect a school of fish etc. by transmitting an ultrasonic wave underwater and receiving a reflective wave which is the ultrasonic wave reflected on the school of fish etc.

The image generating device 1 may be connected to a keyboard 31 and a mouse 32 which the user operates. The user can perform various kinds of instructions about generation of an image by operating the keyboard 31 and the mouse 32. The instructions may include the pan/tilt operation of the camera 3, setting of displaying or not-displaying of various information, setting regarding a correction of lens distortion, and a setup of a viewpoint of a synthesized image.

Next, a configuration of the images generating device 1 is described in detail mainly referring to FIG. 1.

As illustrated in FIG. 1, the image generating device 1 may include a captured image inputting module 21, the position acquiring module 15, the posture acquiring module 16, an additional display information acquiring module 17, a memory 18, an imaging position setting module 25, an antenna position setting module 26, a viewpoint setting module 27, a display setting module 28, a distortion correction setting module 29, and a synthesized image generating module 20.

In detail, although the image generating device 1 is configured as a known computer (which is also referred to as processing circuitry 100) and is not illustrated, it may include a CPU, a ROM, a RAM, and a HDD. Further, the image generating device 1 may be provided with a GPU for performing three-dimensional image processing (described later) at high speed. The HDD stores, for example, software for performing image generating method of the present disclosure. By collaboration of the hardware and the software, the image generating device 1 may be functioned as the captured image inputting module 21, the position acquiring module 15, the posture acquiring module 16, the additional display information acquiring module 17, the memory 18, the imaging position setting module 25, the antenna position setting module 26, the viewpoint setting module 27, the display setting module 28, the distortion correction setting module 29, the synthesized image generating module 20, etc.

The captured image inputting module 21 may accept an input of image data outputted from the camera 3, for example, at 30 frames per second. The captured image inputting module 21 may output the inputted image data to the synthesized image generating module 20 (a data synthesizing module 23 described later).

The position acquiring module 15 may acquire the current position of the ship 4 on real time based on the detection results of the GNSS receiver 7 and the acceleration sensor 8.

The posture acquiring module 16 may acquire the current posture of the ship 4 on real time based on the detection results of the GNSS compass 5 and the angular velocity sensor 6.

Figure 3:
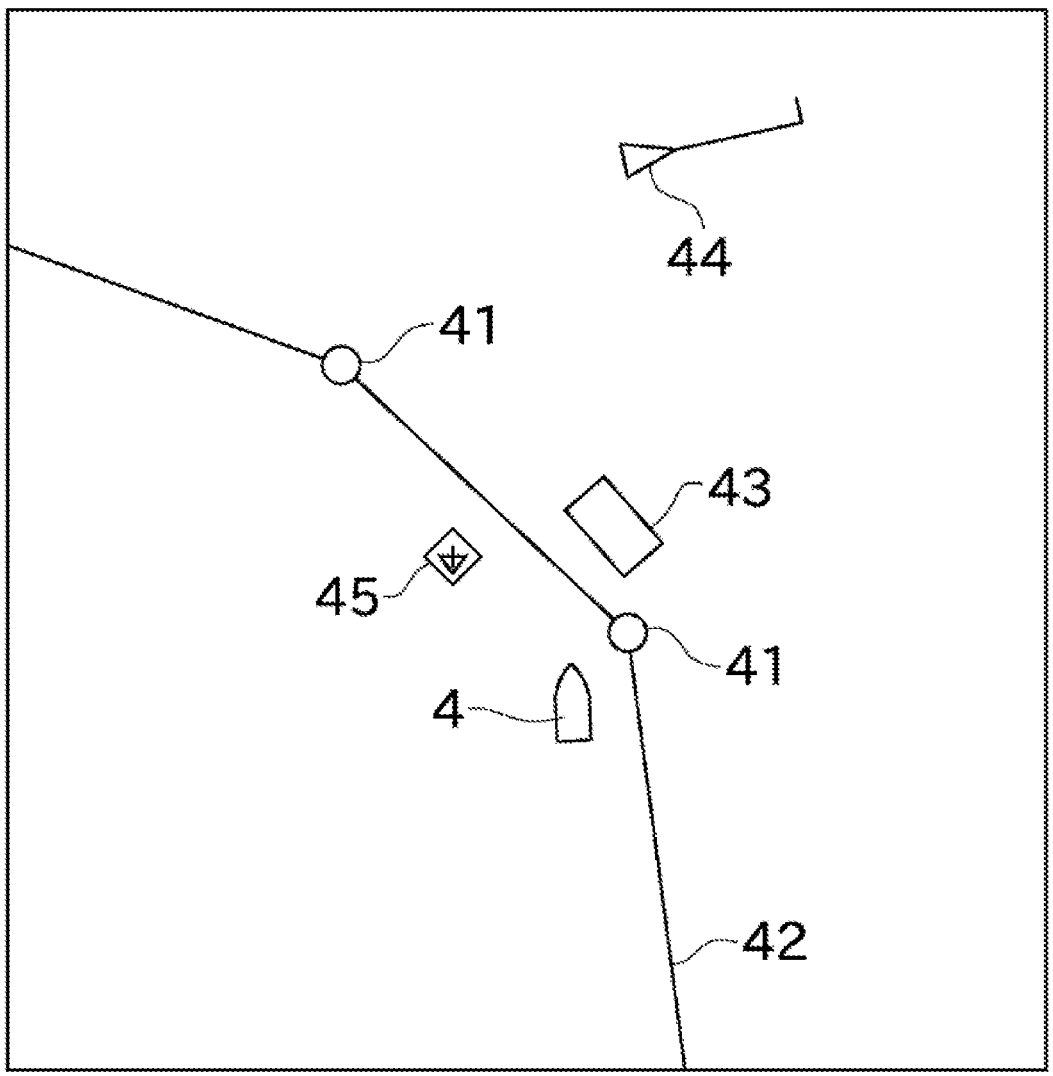
FIG. 3 is a conceptual diagram illustrating one example of the additional display information to be displayed in the image generating device.

The additional display information acquiring module 17 may acquire information to be displayed in addition to the image captured by the camera 3 (additional display information) based on information outputted to the image generating device 1 from the AIS receiver 9, the ECDIS 10, the plotter 11, the radar device 12, the sonar 13, etc. Although various information can be considered as the additional display information, the information may be, for example, about a route line 42 set as the scheduled route of the ship 4 as illustrated in FIG. 3. Note that, the details of the additional display information will be described later.

The memory 18 of FIG. 1 may be configured as a memory which stores various kinds of information. The memory 18 may store three-dimensional shapes of virtual reality objects expressing various kinds of the additional display information as templates. Although the templates of the three-dimensional shapes stored in the memory 18 may be, for example, a small ship or boat, a large-sized ship or vessel, a buoy, a lighthouse, etc., they are not limited to these examples.

The imaging position setting module 25 may set the position of the camera 3 in the ship 4 (imaging position), specifically, the position of the camera 3 in the longitudinal direction and the width direction of the ship, and the position of the camera in the vertical direction (the height of the camera 3). Although the height of the camera 3 may be a height from a waterline normally assumed in the ship 4, it is not limited to this height and it may also be, for example, a height from the ship's bottom. This setup of the imaging position can be performed, for example, by the user operating the keyboard 31, the mouse 32, etc. to input the result of an actual measurement of the position of the camera 3.

The antenna position setting module 26 may set the position of the GNSS antenna in the ship 4 (antenna position). This antenna position can be, for example, positions in the longitudinal direction, the width direction, and the vertical direction of the ship with respect to a reference point 4a set in the ship 4 as a reference of control as illustrated in FIG. 2. Although this reference point 4a can be defined variously, it may be defined at a position at the center of the hull of the ship 4 and at the same height as the waterline normally assumed, in this embodiment. The setup of the antenna position can be performed, for example, by inputting an actual measurement value, similar to the imaging position described above.

The viewpoint setting module 27 of FIG. 1 may set the viewpoint of the image generated by the synthesized image generating module 20 (described later), for example, by the user operating the keyboard 31 and the mouse 32.

The display setting module 28 may set displaying or not-displaying of the additional display information in the image generated by the synthesized image generating module 20 (described later). These settings can be performed by the user operating the keyboard 31 and the mouse 32.

The distortion correction setting module 29 may set a direction in and an intensity of which the image inputted from the captured image inputting module 21 is deformed by software processing, in order to correct lens distortion caused in the image captured by the camera 3. Therefore, the correction can be performed appropriately corresponding to the lens distortion caused in the image, which is variously different depending on the camera 3 (in other words, lens used by the camera 3). This setup of the distortion correction can be performed by the user operating the keyboard 31 and the mouse 32.

The position acquiring module 15, the posture acquiring module 16, the additional display information acquiring module 17, the memory 18, the imaging position setting module 25, the antenna position setting module 26, the viewpoint setting module 27, the display setting module 28, and the distortion correction setting module 29 may acquire, store or output the setting information to the synthesized image generating module 20.

The synthesized image generating module 20 may generate an image expressing extended reality by synthesizing three-dimensional computer graphics with the captured image of the camera 3 inputted into the captured image inputting module 21. This synthesized image generating module 20 may include a three-dimensional scene generating module 22 and the data synthesizing module 23.

Figure 4:
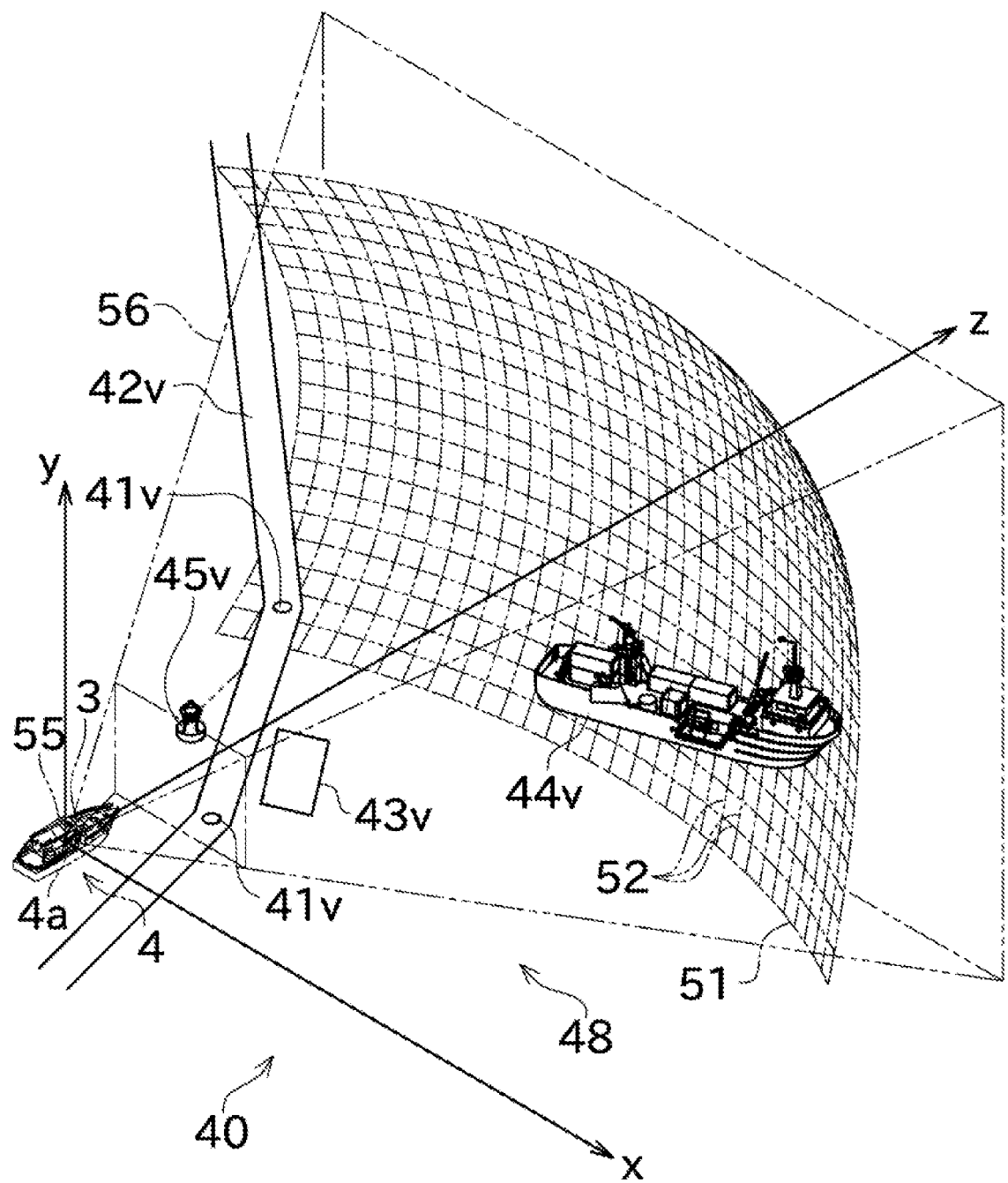
FIG. 4 is a conceptual diagram illustrating three-dimensional scene data established so that virtual reality objects are placed in a three-dimensional virtual space, and a projection screen placed in the three-dimensional virtual space.

As illustrated in FIG. 4, the three-dimensional scene generating module 22 may establish a three-dimensional scene of virtual reality by placing virtual reality objects 41v, 42v, . . . corresponding to the additional display information in a three-dimensional virtual space 40. Therefore, a three-dimensional scene data (three-dimensional display data) 48 which is data of the three-dimensional scene may be generated. Note that the details of the three-dimensional scene will be described later.

Figure 6:
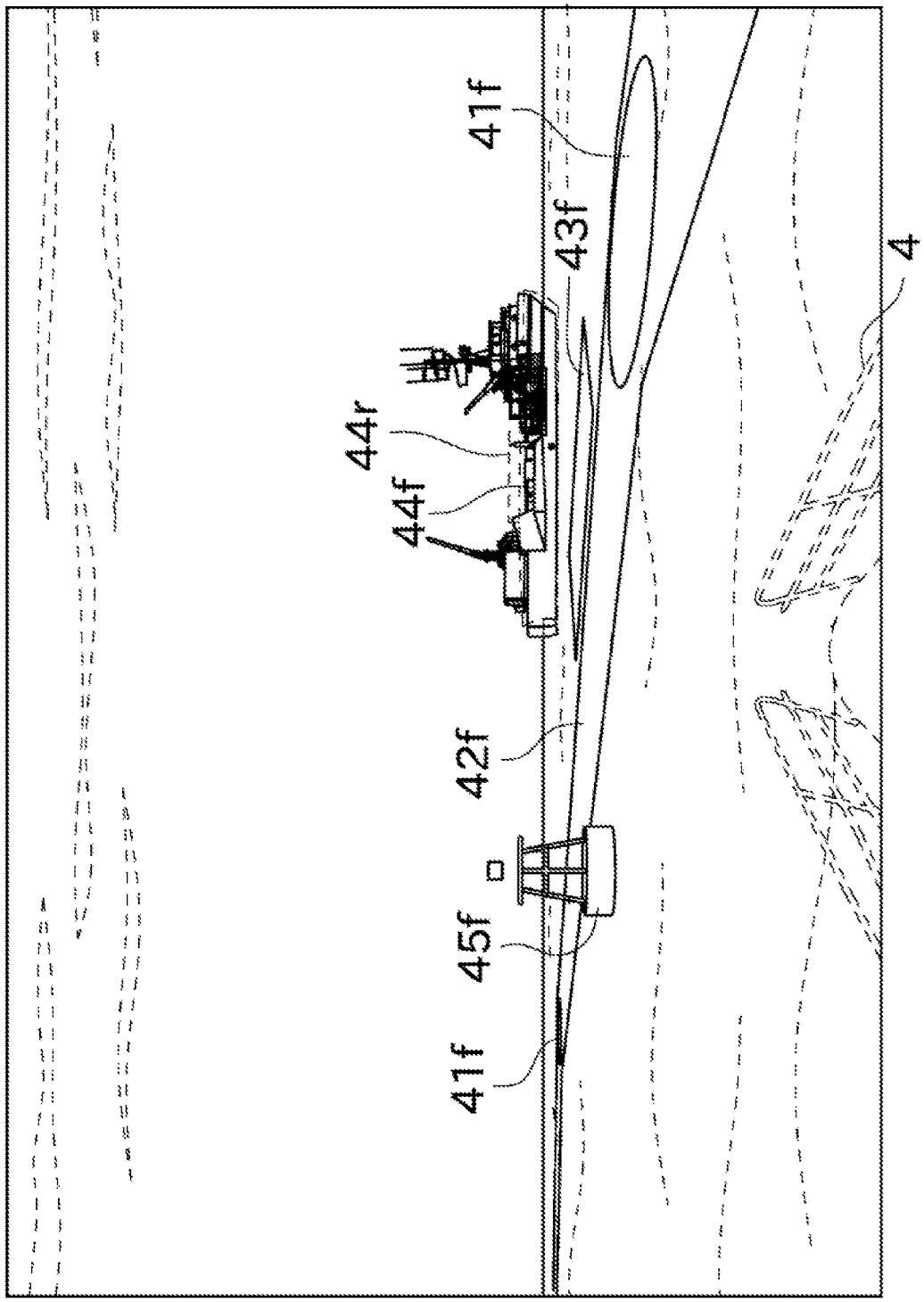
FIG. 6 is a view illustrating a synthesized image outputted from a data synthesizing module.

The data synthesizing module 23 of FIG. 1 may generate a graphic which three-dimensionally expresses the additional display information by rendering the three-dimensional scene data 48 generated by the three-dimensional scene generating module 22. The data synthesizing module 23 may also output a synthesized image as illustrated in FIG. 6, i.e., the image synthesized the graphics 41f, 42f, . . . with the captured image of the camera 3. As illustrated in FIG. 6, in this synthesized image, the graphics 41f, 42f, . . . indicative of the additional display information may be placed on a sea surface image captured by the camera 3 (illustrated in this figure by broken lines for convenience of description) in a superimposed fashion. The data synthesizing module 23 may output the generated synthesized image to the display unit 2. Note that the details of generation of the graphics and the data synthesizing will be described later.

Next, the additional display information described above acquired by the additional display information acquiring module 17 is described in detail. FIG. 3 is a conceptual diagram illustrating one example of the additional display information to be displayed in the image generating device 1.

The additional display information may be information displayed in addition to the image captured by the camera 3, and may be various items according to the purpose and the function of the ship instruments connected to the image generating device 1. For example, as for the AIS receiver 9, the received AIS information (e.g., the position and the direction of another ship, the position of a buoy, and the position of a virtual buoy) may be the additional display information. As for the ECDIS 10, the additional display information may be a position of a dangerous water area, a traveling prohibited area, a lighthouse, or a buoy contained in the electronic nautical chart. As for the plotter 11, the additional display information may be a position of a recorded trace of the ship 4, a scheduled route setting, a waypoint, an arrival area, and a stopping area. As for the radar device 12, the additional display information may be a position, a speed, etc. of a detected target object. As for the sonar 13, a position of a detected school of fish may be the additional display information. These information may be inputted on real time into the image generating device 1 from the ship instruments. The additional display information acquiring module 17 may assign identifying information (e.g., an identification number) for uniquely identifying and managing each of the inputted additional display information.

In FIG. 3, one example of the additional display information located around the ship 4 is illustrated. In FIG. 3, on the sea surface (on the water surface), waypoints 41 indicative of the destination, and the route line 42 in the shape of a polygonal line indicative of the scheduled route to the destination may be defined. Moreover, near the route line 42, a polygon-shaped (rectangular shape) stopping area 43 may be defined. The waypoint 41, the route line 42, and the stopping area 43 may be set by the user suitably operating the plotter 11 beforehand to specify the position of each location.

Moreover, in the example of FIG. 3, it may be detected using the AIS information acquired by the AIS receiver 9 that another ship 44 is traveling to the right of the ship 4 at a location a little distant forward from the ship 4, and a virtual buoy 45 is located near, forward and left side of the ship 4. Note that, although the virtual buoy is not actually provided on the sea due to situations, such as a difficulty of installation, it may mean an imaginary buoy (intangible) displayed as a label or marker in the screen of a navigation device.

Each additional display information may include information at least indicative of the position (latitude and longitude) of one or more locations on the sea surface (water surface) at which it is placed. For example, the additional display information indicative of the route line 42 includes information on positions of two locations used as bends of the polygonal line (the positions of the locations of the bends correspond to the positions of the waypoint 41). The additional display information on the stopping area 43 may include information at the position of each location used as a vertex of the polygon. Moreover, the additional display information indicative of another ship 44 may include information indicative of the position, the bow direction, the length and the width of another ship 44.

Next, the establishment of the three-dimensional scene by the three-dimensional scene generating module 22, and the synthesizing of the images by the data synthesizing module 23 are described in detail referring to FIG. 4. FIG. 4 is a conceptual diagram illustrating the three-dimensional scene data 48 which is generated by placing the virtual reality objects 41v, 42v, . . . on the three-dimensional virtual space 40, and a projection screen 51 placed on the three-dimensional virtual space 40.

As illustrated in FIG. 4, the three-dimensional virtual space 40 where virtual reality objects 41v, 42v, . . . are placed by the three-dimensional scene generating module 22 may be configured in a rectangular coordinate system which uses a suitable reference position of the ship 4 (e.g., the reference point 4a described above) as the origin, where an xz plane which is a horizontal plane imitates the sea surface (water surface). In the example of FIG. 4, the axis of coordinates may be set such that the +z direction is always in agreement with the bow direction, the +x direction is in agreement with the rightward, and the +y direction is in agreement with upward. Each location (coordinates) in the three-dimensional virtual space 40 may be set so as to correspond to the actual position around the ship 4.

In FIG. 4, one example where the virtual reality objects 41v, 42v, 43v, 44v, and 45v are placed in the three-dimensional virtual space 40, in order to express the situation around the ship 4 illustrated in FIG. 3, is illustrated. Each of the virtual reality objects 41v, 42v, 43v, 44v, and 45v may be expressed as a mass of polygons, and placed so that it contacts the xz plane to reflect a relative position of the additional display information indicated by the virtual reality object with respect to the ship 4 on the basis of the bow direction of the ship 4. Upon determining the positions where these virtual reality objects 41v, 42v, . . . are placed, a calculation using the positions of the GNSS antennas set by the antenna position setting module 26 illustrated in FIG. 1 may be performed.

The virtual reality object 44v indicative of another ship 44 may have the shape of a ship, and may be expressed using a template of the model of a large-sized ship stored beforehand in the memory 18. Moreover, the direction of the model may be oriented so as to indicate the direction of another ship 44 acquired from the AIS information.

The virtual reality object 45v indicative of the virtual buoy 45 may be expressed using a template of the model of a buoy stored beforehand in the memory 18, similar to the virtual reality object 44v of another ship 44.

The virtual reality object 41v of the waypoint 41 may be expressed three-dimensionally in the shape of a thin disk. The virtual reality object 42v of the route line 42 may be expressed three-dimensionally in the shape of a polygonal line comprised of strip plates having a certain thickness and a certain width. The virtual reality object 43v of the stopping area 43 may be expressed three-dimensionally in the shape of a plate having a certain thickness and having a contour of the stopping area 43. For these virtual reality objects 41v, 42v, and 43v, the three-dimensional shapes may be created each time, without using the templates of the models.

The three-dimensional scene generating module 22 may generate the three-dimensional scene data 48 as described above. In the example of FIG. 4, since the virtual reality objects 41v, 42v, . . . are placed on the basis of azimuth from the position of the ship 4 as the origin, when the position of the ship 4 (positions in the east-and-west direction and the north-and-south direction) changes from the state of FIG. 3, or when the bow direction changes due to a turn etc., a new three-dimensional scene where the virtual reality objects 41v, 42v, . . . are rearranged may be established, and the three-dimensional scene data 48 may then be updated. Moreover, for example, when the contents of the additional display information are changed due to traveling of another ship 44 from the state of FIG. 3, the three-dimensional scene data 48 may be updated so that the latest additional display information is reflected.

Then, the data synthesizing module 23 may place in the three-dimensional virtual space 40 the projection screen 51 which defines the position and the area where the captured image of the camera 3 is projected. Moreover, the data synthesizing module 23 may create a mesh 52 which subdivides the projection screen 51, in order to correct the lens distortion caused in the captured image of the camera 3. The mesh 52 may be arranged along the projection screen 51. The synthesizing of the images can be realized by setting the position and the direction of a viewpoint camera 55 described below so that both the projection screen 51 and the virtual reality objects 41v, 42v, . . . are contained in the view of the camera 55.

The data synthesizing module 23 may simulate in the three-dimensional virtual space 40 the position and the direction of the camera 3 mounted on the ship 4, and place the projection screen 51 so as to directly oppose to the camera 3. For the simulation of the position of the camera 3, the position of the camera 3 on the basis of the hull can be obtained based on the setting value of the imaging position setting module 25 illustrated in FIG. 1.

Upon the simulation of the position and the direction of the camera 3, the change in the direction of the camera 3 by the pan/tilt operation described above may be taken into consideration. Further, the simulation may be performed so that the change in the position and the direction of the camera 3 due to the change in the posture and the height of the ship 4 are reflected based on the positional information and the posture information acquired by the position acquiring module 15 and the posture acquiring module 16. The data synthesizing module 23 may interlock with the change in the position and the direction of the camera 3 to change the position and the direction of the projection screen 51 placed in the three-dimensional virtual space 40.

Then, the data synthesizing module 23 may generate a two-dimensional image by performing known rendering to the three-dimensional scene data 48 and the projection screen 51. In more detail, the data synthesizing module 23 may place as the virtual camera, the viewpoint camera 55 in the three-dimensional virtual space 40, and define a frustum (visual cone) 56 which defines an area to be rendered so that the viewpoint camera 55 is used as a vertex and its line-of-sight direction becomes the center axis. Then, the data synthesizing module 23 may convert coordinates of a vertex of the polygon located inside the frustum 56 among the polygons which constitute each object (one of the virtual reality objects 41v, 42v, . . . , and the projection screen 51) into coordinates of the two-dimensional virtual screen corresponding to the display area (in other words, perspective-projection plane) of the synthesized image in the display unit 2 by a perspective projection. Then, based on the vertex placed on the virtual screen, a two-dimensional image may be generated by generating and processing pixels at a given resolution.

The two-dimensional image generated in this way may include graphics obtained by rendering the three-dimensional scene data 48 (in other words, the graphics as results of rendering the virtual reality objects 41v, 42v, . . . ). Moreover, during the generation of the two-dimensional image, the captured image of the camera 3 may be placed so as to be pasted at the position corresponding to the projection screen 51. Therefore, the synthesizing of the images by the data synthesizing module 23 may be realized.

When the position and the direction of the viewpoint camera 55 have been arranged so that they may be in agreement with the camera 3 since the projection screen 51 has a shape which is curved so as to meet the spherical shell centering on a camera 3, it can prevent distortion of the captured image by a perspective projection. Moreover, the captured image may be rendered as if pieces obtained by finely dividing in the vertical and horizontal directions (image pieces) are placed on the projection screen 51 while being deformed conforming to the mesh 52 projected on the virtual screen. Therefore, by setting the shape of the mesh 52 appropriately, the above-described lens distortion caused in the captured image can be appropriately corrected. Note that, the details of this processing will be described later.

The viewpoint camera 55 may define the viewpoint of the synthesized image, and its position and direction may be defined by settings of the viewpoint setting module 27.

However, by making a special setting in the viewpoint setting module 27, the data synthesizing module 23 may set a mode when generating the synthesized image as a mode in which the position and the direction of the viewpoint camera 55 change automatically so that they are always in agreement with the position and the direction of the camera 3 (viewpoint tracking mode). In this viewpoint tracking mode, since the entire view of the viewpoint camera 55 is always covered by the projection screen 51 (i.e., the captured image of the camera 3), the realistic synthesized image with presence can be realized.

On the other hand, the data synthesizing module 23 can also set the mode into a mode in which the position and the direction of the viewpoint camera 55 follows the viewpoint set in the viewpoint setting module 27 by a proper operation of an input device, regardless of the position and the direction of the camera 3 (independent viewpoint mode). The input device may include, for example, a keyboard 31, a mouse 32, a touch panel (not illustrated), a joy stick, etc. In this independent viewpoint mode, the user can move the viewpoint freely to confirm the additional display information at a position out of the imaging coverage of the camera 3.

Figure 5:
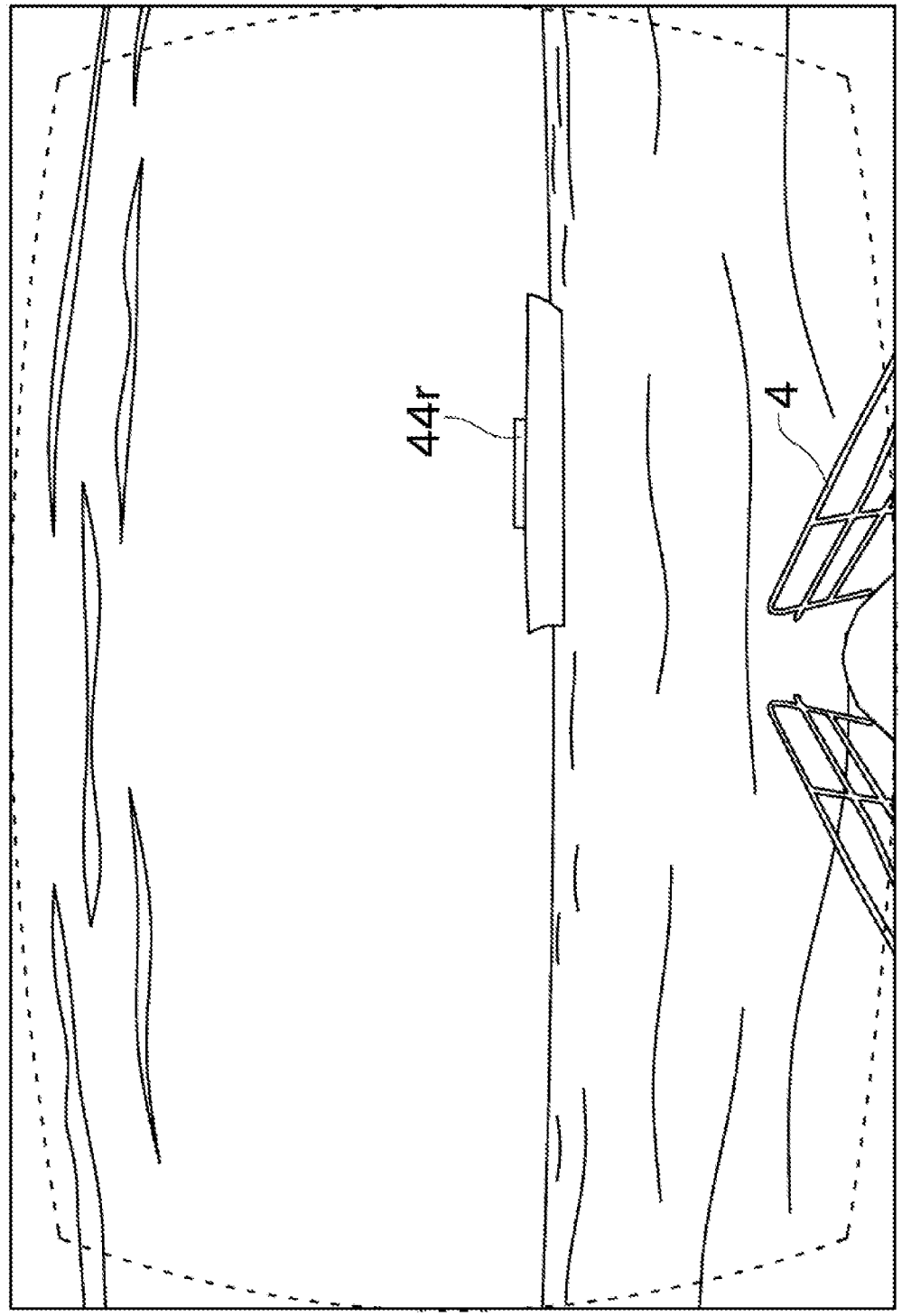
FIG. 5 is a view illustrating one example of a captured image by a camera.

Next, a relation between the image captured by the camera 3 and the synthesized image is described referring to one example. FIG. 5 is a view illustrating one example of the image captured by the camera 3. FIG. 6 is a view illustrating the synthesized image outputted from the data synthesizing module 23.

In FIG. 5, one example of the image captured by the camera 3 of the ship 4 in the situation indicated in FIG. 3 is illustrated. Another ship 44r floating on the sea surface is in the captured image. Moreover, a bow part of the ship 4 is located at the lower center of the image.

Moreover, in the captured image of the camera 3, as illustrated by a broken line in FIG. 5, distortion in which central parts of the vertical and horizontal edges expand outside may occur under the influence of the wide angle lens (barrel-type lens distortion).

Since the virtual buoy 45 is virtual as described above, it will not be caught by the camera 3, as illustrated in FIG. 5. Since the waypoint 41, the route line 42, and the stopping area 43 are also created by the setup of the plotter 11, they will not appear in the image captured by the camera 3.

FIG. 6 illustrates a result of correcting the lens distortion according to the mesh 52 and synthesizing the two-dimensional image obtained by rendering the three-dimensional scene data 48 in FIG. 4 with the captured image illustrated in FIG. 5. However, in FIG. 6, the parts which appear in the image captured by the camera 3 are illustrated by broken lines for convenience in order to facilitate the distinction from other parts (similar processing is also applied to other views indicating the synthesized image). In the synthesized image of FIG. 6, the graphics 41f, 42f, 43f, 44f, and 45f expressing the additional display information are placed so as to overlap with the captured image. The graphic 44f indicative of another ship is placed so as to substantially overlap with the position of another ship 44r in the captured image.

The graphics 41f, 42f, . . . may be generated as results of rendering the three-dimensional shapes of the virtual reality objects 41v, 42v, . . . which constitute the three-dimensional scene data 48 illustrated in FIG. 4, from the viewpoint at the same position and the direction as those of the camera 3. Therefore, even when the graphics 41f, 42f, . . . are superimposed with the realistic image captured by the camera 3, a visual disagreement may not substantially occur.

As illustrated in FIG. 6, the graphics 41f, 42f, . . . which express the additional display information in virtual reality may be placed on the synthesized image as if they are placed on the sea surface of the captured image. This may be realized by placing the virtual reality objects 41v, 42v, . . . illustrated in FIG. 4 so as to touch the xz plane located below the camera 3 by a distance calculated based on the height set by the imaging position setting module 25 (see FIG. 1), and correctly placing the position of the projection screen 51 in consideration of the position and the direction of the camera 3.

Figure 7:
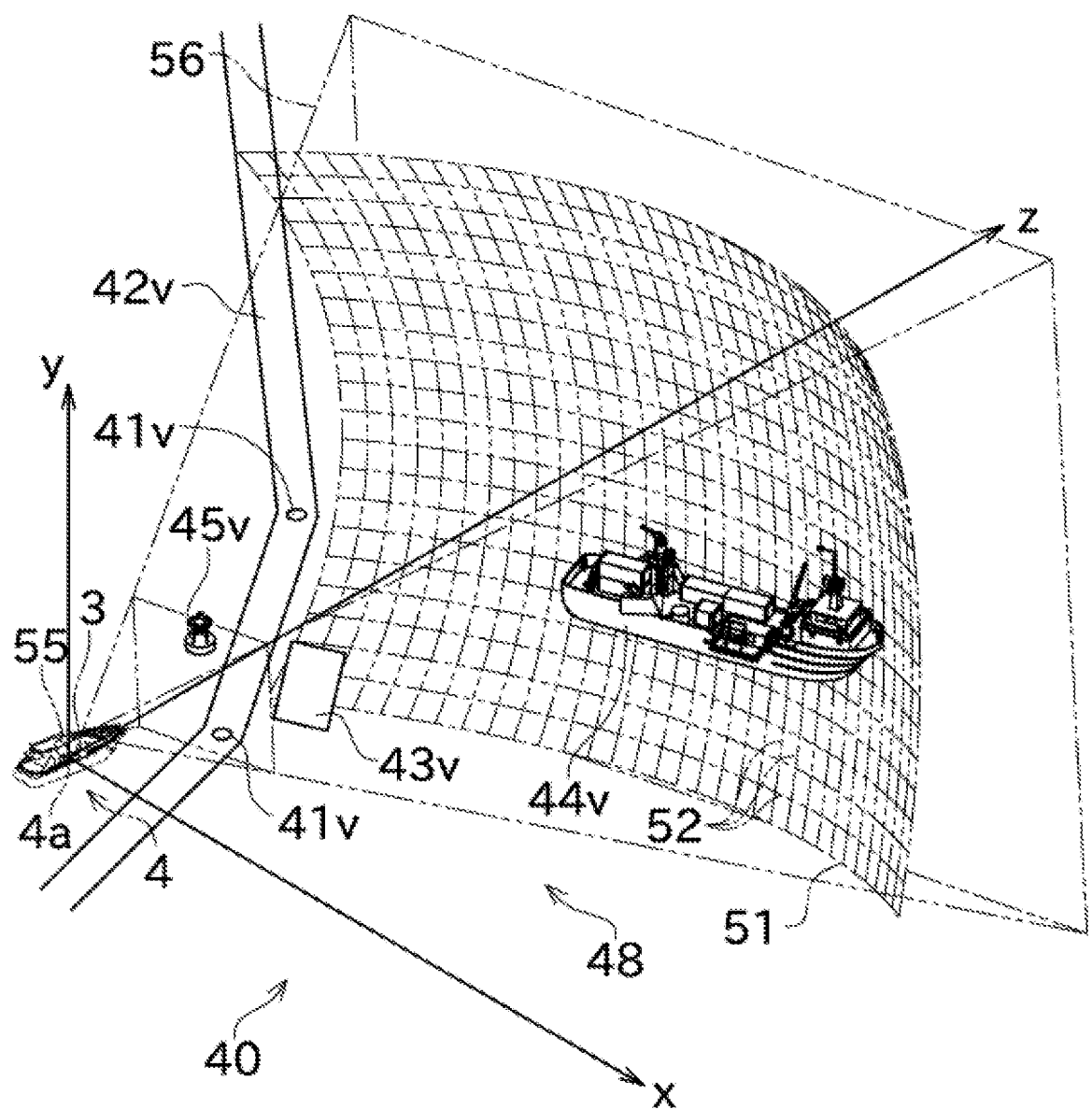
FIG. 7 is a conceptual diagram illustrating a case where the ship shakes in a pitch direction and a roll direction from the state of FIG. 4.
Figure 8:
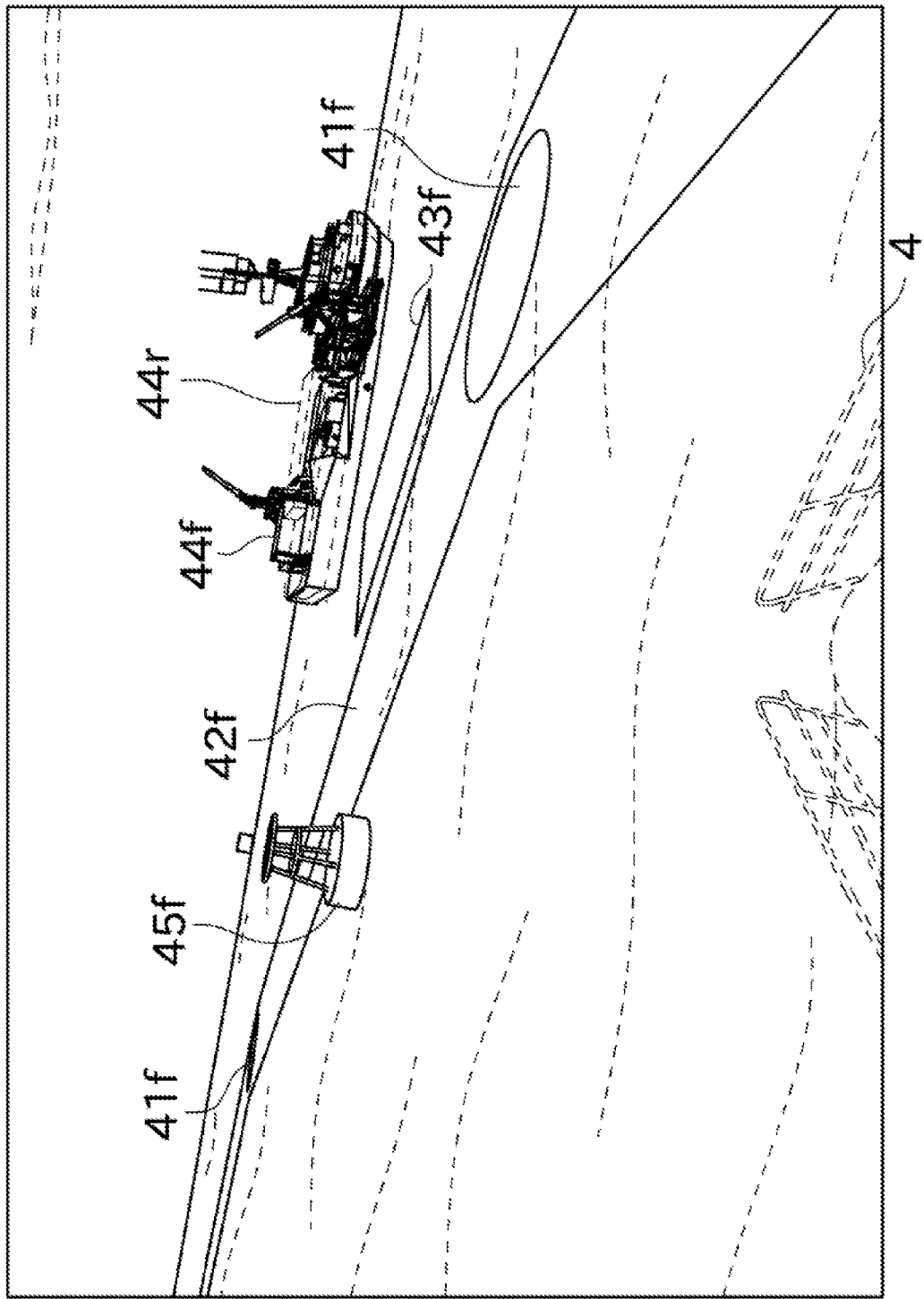
FIG. 8 is a view illustrating a synthesized image in the case of FIG. 7.

Next, a change in the synthesized image accompanying the shake of the ship 4 is described. FIG. 7 is a conceptual diagram illustrating a case where the ship 4 shakes in the pitch direction and the roll direction from the state of FIG. 4. FIG. 8 is a view illustrating the synthesized image in the case of FIG. 7.

As described above, since the camera 3 is attached to the ship 4, its position and direction may change in connection with the posture of the ship 4 inclining by a wave etc., or the ship 4 running over a wave. In this embodiment, when a shake (pitching, rolling and heaving) occurs on the ship 4, the data synthesizing module 23 may change the position and the direction of the camera 3 in the three-dimensional virtual space 40 so as to simulate a change in the posture of the ship 4 acquired by the posture acquiring module 16, and a change in the position of the ship 4 in the vertical direction acquired by the position acquiring module 15, and change the position of the projection screen 51 accordingly.

In FIG. 7, a situation when the posture of the ship 4 changes in the pitch direction and the roll direction from the state of FIG. 4 is illustrated. In the example of FIG. 7, the ship 4 inclines the bow downward and the port downward, and the position and the direction of the camera 3 change so as to reflect the inclination. The projection screen 51 interlockedly moves to directly oppose to the camera 3 of which the position and the direction changed.

In the example of FIG. 7, by the viewpoint tracking mode, the position and the direction of the viewpoint camera 55 also change so as to follow the camera 3 of which the position and the direction changed as described above. One example of the synthesized image corresponding to FIG. 7 is illustrated in FIG. 8, and as illustrated in this figure, even if the position and the direction of the camera 3 change in connection with the shake of the ship 4, since the position and the direction of the projection screen 51 interlockedly change, and the position and the direction of the viewpoint camera 55 which renders the three-dimensional scene change, a comfortable synthesized image can be continuously obtained.

In the viewpoint tracking mode, each time the pitch angle or the roll angle changes more than a given value with the shakes of the ship 4, the rendering of the three-dimensional scene data 48 may be updated by the data synthesizing module 23, and, therefore, the graphics 41f, 42f, . . . based on the latest viewpoint may be generated. Accordingly, the display of the graphics 41f, 42f, . . . can be changed appropriately to maintain a state where they are placed on the sea surface, while the direction in which the sea surface appears change in the captured image of the camera 3 with the shakes of the ship 4.

Therefore, the extended-reality image in which the imaginary objects can be seen as if they are floating on the sea surface, and which is natural and high in the actual feeling can be obtained. Moreover, by the user looking at the sea surface projected on the display unit 2, since the graphics 41f, 42f, . . . indicating the virtual reality come into the user's field of view comprehensively, he/she can acquire every piece of necessary information.

Figure 9:
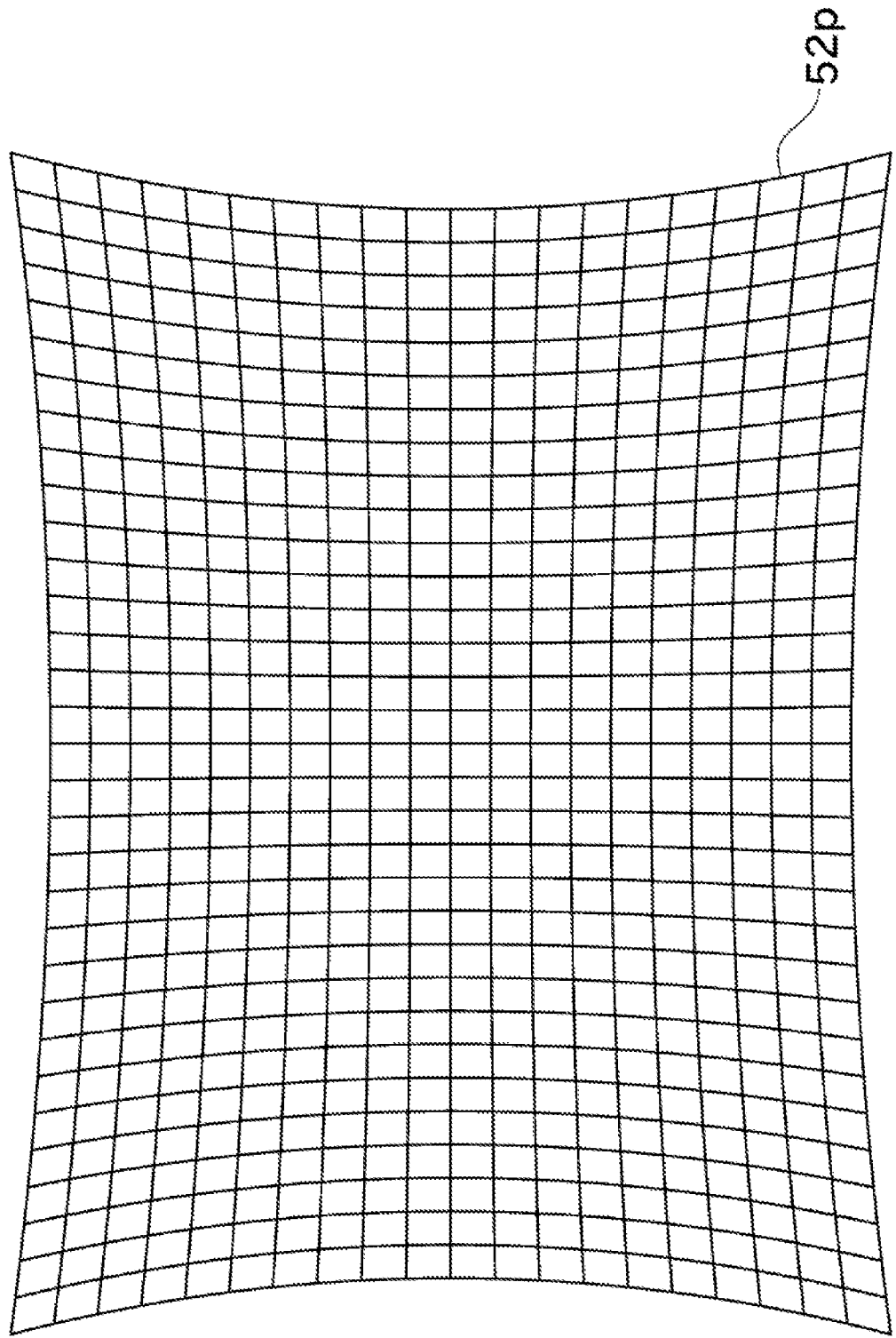
FIG. 9 is a view illustrating a two-dimensional mesh deformation as one example of processing to correct lens distortion of the captured image.
Figure 10:
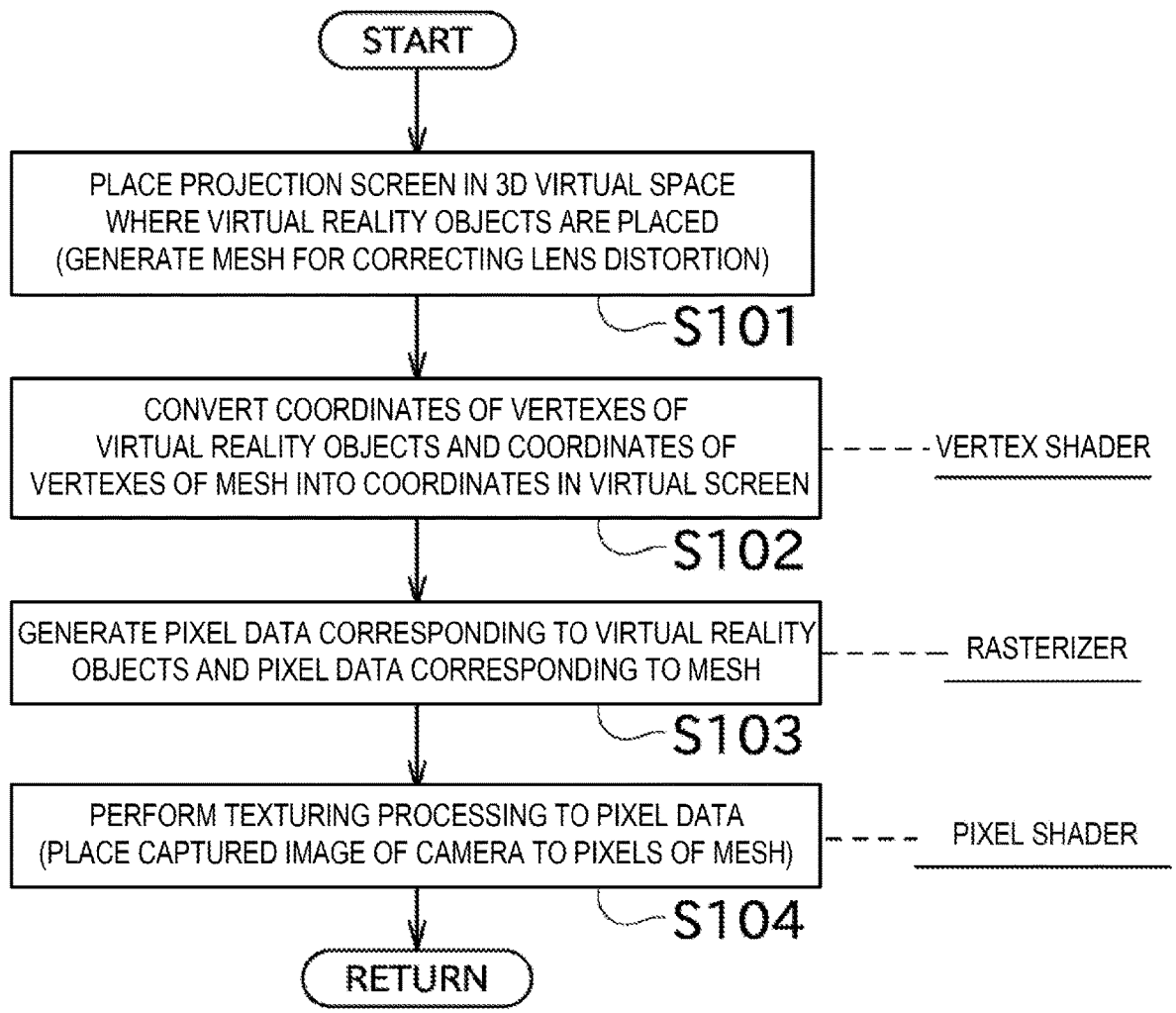
FIG. 10 is a flowchart illustrating processing executed by a data synthesizing module in order to perform a correction of the lens distortion of the captured image, and a perspective projection of the captured image and a three-dimensional scene.
Figure 11:
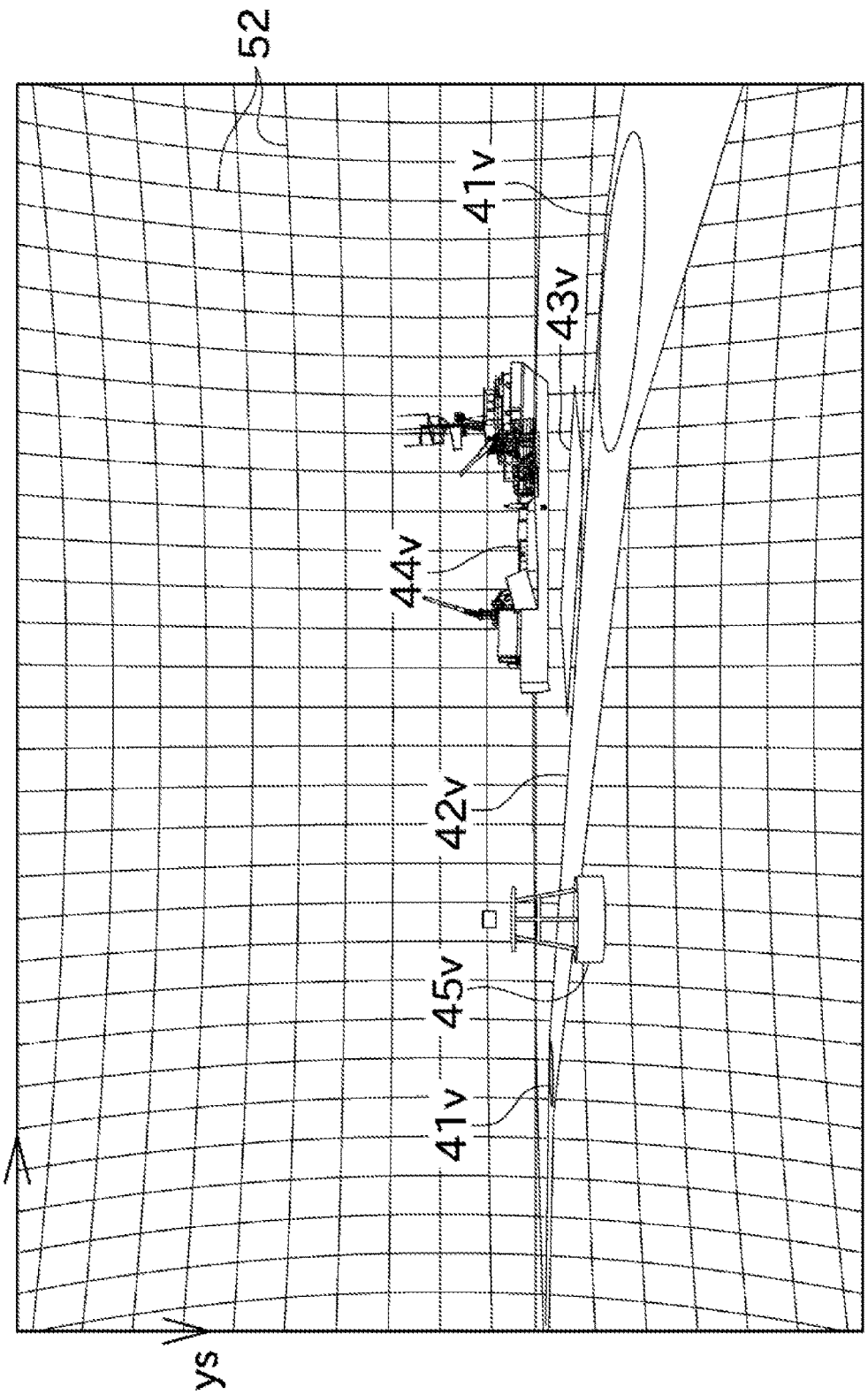
FIG. 11 is a conceptual diagram illustrating one example in which vertexes of virtual reality objects and mesh are projected on a virtual screen in the state of FIG. 4.

Next, processing for efficiently performing by the data synthesizing module 23 described above the correction of the lens distortion of the captured image, and the synthesizing of the graphics 41f, 42f, . . . rendering the virtual reality objects 41v, 42v, . . . , with the captured image is described concretely. FIG. 9 is a view illustrating a planar mesh 52p for correcting the lens distortion of the captured image. FIG. 10 is a flowchart illustrating processing executed by the data synthesizing module 23 for performing the correction of the lens distortion of the captured image, and the perspective projection of the captured image and the three-dimensional scene. FIG. 11 is a conceptual diagram illustrating processing for performing a coordinate conversion so that vertexes of the virtual reality objects 41v, 42v, . . . and the mesh 52 placed in three-dimensional space are projected on the virtual screen.

In the example of FIG. 5, the barrel-type lens distortion occurs in the image captured by the camera 3, as described above. On the other hand, since the graphics 41f, 42f, . . . which are synthesized with the captured image is generated by rendering the three-dimensional virtual reality objects 41v, 42v, . . . based on a geometric calculation, the distortion etc. may not theoretically be produced. Therefore, if both the graphics and objects are simply synthesized, the synthesized image may become unnatural and the user may feel uncomfortable with the image.

Generally the lens distortion of the captured image can be corrected by being deformed so that it is expanded or contracted along the mesh 52p in the two-dimensional plane as illustrated in FIG. 9 (mesh deformation). This mesh 52p can be created by distorting the rectangular matrix mesh in the opposite direction of the lens distortion caused in the captured image. If the barrel-type lens distortion occurs in the captured image as illustrated in FIG. 5, the mesh 52p which corrects the distortion may become a spool type as illustrated in FIG. 9.

Therefore, theoretically, the synthesized image of FIG. 6 can be obtained by two-dimensionally correcting beforehand the lens distortion of the captured image by using the mesh 52p, and placing the corrected captured image in the three-dimensional virtual space 40 of FIG. 4, and carrying out the perspective projection of the placed image to the virtual screen according to the viewpoint camera 55.

However, the captured image of the camera 3 may be configured as raster data in which pixels are arranged in a two-dimensional matrix. Therefore, if the image is deformed for correcting the lens distortion (by using the mesh 52p of FIG. 9) and the image is further deformed for the perspective projection, the quality of the captured image may be greatly deteriorated due to the repetition of the deformation, and it may also require a great deal of processing time.

In order to solve this problem, the data synthesizing module 23 of this embodiment may generate the synthesized image by the following processing. Below, the processing is described in detail with reference to the flowchart of FIG. 10.

At Step S101 of FIG. 10, the data synthesizing module 23 may place the projection screen 51 having the shape which curves along a spherical shell in the three-dimensional virtual space 40 where the virtual reality objects 41v, 42v, . . . are placed (in other words, the three-dimensional scene data 48 is established) by the three-dimensional scene generating module 22 as illustrated in FIG. 4, based on the simulation result of the position and the direction of the camera 3. At this time, the data synthesizing module 23 may generate the mesh 52 for correcting the lens distortion of the captured image so as to conform to the projection screen 51. This mesh 52 may be expressed as a three-dimensional shape (a mass of polygons) similar to the virtual reality objects 41v, 42v, . . . .

The meshes 52 of FIG. 4 which the data synthesizing module 23 generates in this step S101 may differ from the planar mesh 52p of FIG. 9, and may be curving in the shape of a spherical shell corresponding to the form of the projection screen 51. That is, this mesh 52 may correspond to the planar mesh 52p of FIG. 9 being curved along the spherical shell. The intensity of the distortion of the three-dimensional spool type mesh 52 can be suitably set by the distortion correction setting module 29 described above. Moreover, in the stage of Step S101, the mesh 52 may only function as a placeholder of the captured image, and therefore, the raster data of the captured image may not actually be pasted in this stage.

Next, at Step S102 of FIG. 10, the data synthesizing module 23 may perform the projection conversion by the perspective projection in which the coordinates of the vertexes of the virtual reality objects 41v, 42v, . . . and the coordinates of the vertexes of the mesh (face) 52 in the three-dimensional virtual space 40 into the coordinates in the two-dimensional virtual screen, after defining the viewpoint camera 55 and the visual cone 56 in the three-dimensional virtual space 40. This coordinate conversion may be realized using a coordinate conversion function provided to a vertex shader among a series of processing programs (a known rendering pipeline) for the GPU to execute the three-dimensional image processing. In FIG. 11, one example in which the vertexes of the three-dimensional scene data 48 (the virtual reality objects 41v, 42v, . . . ) and the mesh 52 illustrated in FIG. 4 are projected on the two-dimensional virtual screen where the upper left corner is used as the origin, and the horizontal axis is set as "xs" axis and the vertical axis is set as "ys" axis, is illustrated.

Then, at Step S103 of FIG. 10, the data synthesizing module 23 may generate pixel data corresponding to the virtual reality objects 41v, 42v, . . . and pixel data corresponding to the mesh 52 based on the positions of the vertexes converted into the coordinates on the two-dimensional virtual screen. This function may be realized using the function of a rasterizer among the rendering pipelines.

At this time, the colors of the pixels rendering the virtual reality objects 41v, 42v, . . . may comply with the information on the color contained in the information provided to each vertex of the polygon. Therefore, by the three-dimensional scene generating module 22 described above setting the proper color to each vertex of the polygon for the virtual reality objects 41v, 42v, . . . placed in the three-dimensional scene data 48 of FIG. 4, the color of the graphics 41f, 42f, . . . displayed can be variously changed. In this embodiment, for the graphic 44f indicative of another ship 44, processing for changing the display color is performed according to a distance from the location where the ship 4 may be placed. In detail, when another ship 44 is located at a position distant from the ship 4, the graphic 44f may be displayed in green, and when it is located at a closer position, the graphic 44f may be displayed in red. Therefore, the user's attention can be appropriately drawn according to the situation.

After that, at Step S104, the data synthesizing module 23 may subdivide the captured image of the camera 3 in the form of the rectangle matrix, and may place the obtained image pieces on the corresponding pixels of the mesh 52 in the two-dimensional virtual screen (FIG. 11). In this embodiment, this processing may be realized by using the function of pixel shader (specifically, a pasting function of texture) among the rendering pipelines. Therefore, the synthesized image illustrated in FIG. 6 can be obtained.

As described above, in the stage of the vertexes of the polygons (a stage before expressing by the pixels), the deformation for correcting the lens distortion and the deformation based on the perspective projection may be performed to the mesh 52, and the captured image of the camera 3 may then be placed according to the mesh 52. Therefore, the captured image after the lens distortion is corrected and the perspective projection is carried out can be obtained only by a single deformation of the raster image. As a result, the fall of the image quality at the portion of the captured image in the synthesized image can be effectively prevented. Moreover, since the load of the pixel shader can be significantly reduced, the processing can easily catch up the pace, even when the captured image is inputted at a high frame rate (30 frames per second) like this embodiment. As a result, since the frame omission can be prevented, the high-quality synthesized image with a smooth motion at the portion of the captured image can be obtained.

As described above, the image generating device 1 of this embodiment may include the captured image inputting module 21, the position acquiring module 15, the posture acquiring module 16, the additional display information acquiring module 17, and the synthesized image generating module 20. The captured image inputting module 21 accepts the input of the captured image captured by the camera 3 installed in the ship 4. The position acquiring module 15 may acquire the positional information indicative of the position of the ship 4. The posture acquiring module 16 may acquire the posture information indicative of the posture of the ship 4. The additional display information acquiring module 17 may acquire the additional display information including the information indicative of the positions of one or more locations. The synthesized image generating module 20 may place, based on the positional information and the posture information, the viewpoint camera 55 in the three-dimensional virtual space 40, at least one of the additional display information in the three-dimensional virtual space 40 as the three-dimensional virtual reality objects 41v, 42v, . . . and the virtual projection screen 51, to create the mesh 52 which subdivides the projection screen 51 and is distorted to the opposite direction from the lens distortion caused in the captured image of the camera 3. The synthesized image generating module 20 may convert the vertexes of the virtual reality objects 41v, 42v, . . . , and the vertexes of the mesh 52 into the positions in the two-dimensional virtual screen which is the perspective-projection plane by the vertex shader based on the position and the direction of the viewpoint camera 55. Moreover, the synthesized image generating module 20 may be placed the image pieces which are obtained by subdividing the captured image of the camera 3 on the corresponding mesh by the pixel shader based on the positions of the vertexes in the virtual screen. By the above processing, the synthesized image generating module 20 may generate the synthesized image in which the graphics 41f, 42f, . . . rendering the virtual reality objects 41v, 42v, . . . are synthesized with the captured image.

Moreover, in this embodiment, the image may be generated by the following methods. That is, the input of the captured image captured by the camera 3 installed in the ship 4 may be accepted, the positional information indicative of the position of the ship 4 may be acquired, the posture information indicative of the posture of the ship 4 may be acquired, and the additional display information including the information indicative of the positions of one or more locations is acquired. Based on the positional information and the posture information, the viewpoint camera 55 may be placed in the three-dimensional virtual space 40, at least one of the additional display information is placed in the three-dimensional virtual space 40 as the three-dimensional virtual reality objects 41v, 42v, . . . and the virtual projection screen 51 may be placed. The mesh 52 which subdivides the projection screen 51 and is distorted to the opposite direction from the lens distortion caused in the captured image of the camera 3 may be created. Based on the position and the direction of the viewpoint camera 55, the vertexes of the virtual reality objects 41v, 42v, . . . and the vertexes of the mesh 52 may be converted into the positions in the two-dimensional virtual screen which is the perspective-projection plane by the vertex shader. Based on the positions of the vertexes in the virtual screen, the image pieces obtained by subdividing the captured image of the camera 3 may be placed on the corresponding mesh 52 by the pixel shader to generate the synthesized image in which the graphics 41f, 42f, . . . rendering the virtual reality objects 41v, 42v, . . . are synthesized with the captured image.

Therefore, the synthesized virtual reality image as illustrated in FIGS. 6 and 8 can be obtained by superimposing the graphics 41f, 42f, . . . which express the positions etc. of the additional display information by the three-dimensional computer graphics on the captured image of the camera 3 based on the position and the posture of the ship 4. Moreover, since the captured image is synthesized with the three-dimensional computer graphics in the state where the lens distortion caused in the captured image as illustrated in FIG. 5 is corrected, the uncomfortableness when synthesized can be reduced. Further, the mesh 52 for correcting the lens distortion may be placed in the three-dimensional virtual space 40, the vertexes of the mesh 52 may be converted into the positions in the virtual screen, and the image pieces obtained by subdividing the captured image of the camera 3 may be placed on the corresponding mesh 52, to appropriately correct the lens distortion. Moreover, since the perspective projection in consideration of the correction of the lens distortion is performed by the vertex shader in the stage of the vertex coordinate data, and the raster data of the captured image is then placed by the pixel shader, the deformation of the raster data may only be performed once. Therefore, the degradation of the image quality can be prevented, and the speed of the processing can be largely increased, as compared with the case where the processing to deform the raster data of the captured image is performed individually for the correction of the lens distortion and the perspective projection.

Moreover, the image generating device 1 of this embodiment can operate in the viewpoint tracking mode, i.e., in the mode in which the position and the direction of the viewpoint camera 55 change automatically so as to be always in agreement with the position and the direction of the camera 3. In this viewpoint tracking mode, the synthesized image generating module 20 may move the positions and the directions of the projection screen 51 and the viewpoint camera 55 in the three-dimensional virtual space 40 so as to correspond to the changes in the simulated position and direction of the camera 3, when the posture information acquired by the posture acquiring module 16 is changed.

Therefore, when the ship 4 shakes by a wave etc. and the position etc. of the camera 3 is changed, the display of the three-dimensional computer graphics (the graphics 41f, 42f, . . . ) can be updated by the simple processing so as to be consistent with the change in the captured image by moving the viewpoint camera 55 and the projection screen 51 accordingly. Moreover, because the viewpoint camera 55 and the projection screen 51 move in the mutually interlocked manner, processing, for example, to cause the captured image to always appear in the synthesized image can also be performed easily.

Moreover, the image generating device 1 of this embodiment may be configured to be changeable of at least one of the direction and the amount of distortion of the mesh 52 to be created.

Therefore, since the direction and the intensity of the correction of the lens distortion can be adjusted, this can be applied to a wide range of cameras 3 (e.g., cameras with different angles of view of the lens).

Moreover, in the image generating device 1 of this embodiment, the mesh 52 may be arranged in the curved shape in the three-dimensional virtual space 40, as illustrated in FIG. 4.

Therefore, in the synthesized image, the captured image may appear in the natural way.

Moreover, in the image generating device 1 of this embodiment, the additional display information may be at least any of another ship, the landmark, the scheduled route, the route trace, the waypoint, the stopping location (which is also referred to as drop-in location), the destination, the ocean space where a school of fish is detected, the foul water, the traveling prohibited area, the buoy, and the virtual buoy.

Therefore, the useful information for the user including the spatial relationship can be displayed in the form which is easy to grasp intuitively.

Moreover, the image generating device 1 of this embodiment may change the color of the graphics 41f, 42f, . . . displayed corresponding to the additional display information depending on the distance between the location indicated by the additional display information and the ship 4.

Therefore, for example, when another ship 44 exists nearby, the user can understand this situation appropriately by displaying the graphic 44f which expresses the additional display information indicative of another ship 44 in the color which is more emphasized than others.

Moreover, although the image generating device 1 of this embodiment outputs the synthesized image to the display 2 installed in the ship 4, it may be configured to output the synthesized image to a portable computer, a head mounted display, etc.

Therefore, the synthesized image can be effectively utilized.

Although the suitable embodiment of the present disclosure is described above, the above configuration may, for example, be changed as follows.

Depending on the camera 3, it may cause a spool type lens distortion, instead of the barrel-type lens distortion as illustrated in FIG. 5. In this case, by using the mesh 52 distorted in the barrel shape, the lens distortion can be appropriately corrected.

The setting function of the distortion of the mesh 52 by the distortion correction setting module 29 can be intuitively performed by setting the direction and the intensity of the distortion by using a dialog, or may be, for example, by displaying the pattern of the mesh 52 on the display 2 and dragging the pattern by using the mouse 32.

In the camera 3, the pan/tilt function described above may be omitted, and the imaging direction may be fixed, for example, to forward. Moreover, the camera 3 may be installed so as to image a direction other than the forward (e.g., rearward).

When the user changes the direction of the viewpoint camera 55, the pan/tilt operation of the camera 3 may be automatically performed so as to follow the change in the direction.

As the camera 3, a camera having a plurality of lenses directed in different directions, and image sensors corresponding to the respective lens, and configured to perform a live output while connecting the image pick-up results of the plurality of image sensors, may be used. In this case, the lens distortion can be corrected by arranging what connected the mesh corresponding to the plurality of lenses on the three-dimensional virtual space 40.

As the camera 3, a camera configured to be capable of simultaneously imaging the perimeter of the ship 4 in all directions of 360 degrees may be used.

For example, the change in the color of the graphic 44f indicative of another ship 44 which is displayed in the synthesized image may be realized by changing the color of texture image pasted to the virtual reality object 44v, instead of changing the color set for the vertex of the polygon of the virtual reality object 44v.

Upon generating the three-dimensional scene data 48 by the three-dimensional scene generating module 22, the virtual reality objects 41v, 42v, . . . may be placed on the basis of the bow direction using the position of the ship 4 as the origin in the above embodiment, as illustrated in FIG. 4. However, the virtual reality objects 41v, 42v, . . . may be placed on the basis of north in which the +z direction always points north, without the bow direction. In this case, when the bow direction of the ship 4 changes due to a turn etc., the direction of the ship 4 in the three-dimensional virtual space 40 may be changed to the yaw direction, instead of rearranging the virtual reality objects 41v, 42v, . . . . Then, the changes in the position and the direction of the camera 3 at this time may be simulated in the three-dimensional virtual space 40, and a rendering may be performed in the interlocking manner while changing the position and the direction of the viewpoint camera 55, thereby obtaining the completely same rendering result as the case of the bow direction basis.

Alternatively, the coordinate system of the three-dimensional virtual space 40 may be defined so that a fixed point suitably defined on the earth is used as the origin, and, for example, the +z direction serves as north and the +x direction serves as east, instead of using the position of the ship 4 as the origin. In this case, in the three-dimensional virtual space 40 of the coordinate system fixed to the earth, the position and the direction of the ship 4 may change based on the positional information and the posture information, and the change in the position and the direction of the camera 3 accompanying the change may be simulated in the three-dimensional virtual space 40.

In the image generating device 1, a shake of the synthesized image accompanying the shake of the ship 4 may be reduced. For example, the three-dimensional scene generating module 22 may reduce the change in the position and the direction of the viewpoint camera 55, even when the ship 4 shakes.

The ship instruments (information source of the additional display information) connected to the image generating device 1 are not limited to what is described in FIG. 1, and other ship instruments may be included.

The present disclosure is applicable not only to the ship which travels on the sea, but may also be applicable to arbitrary water-surface movable bodies which can travel, for example, the sea, a lake, or a river.

Figure 12:
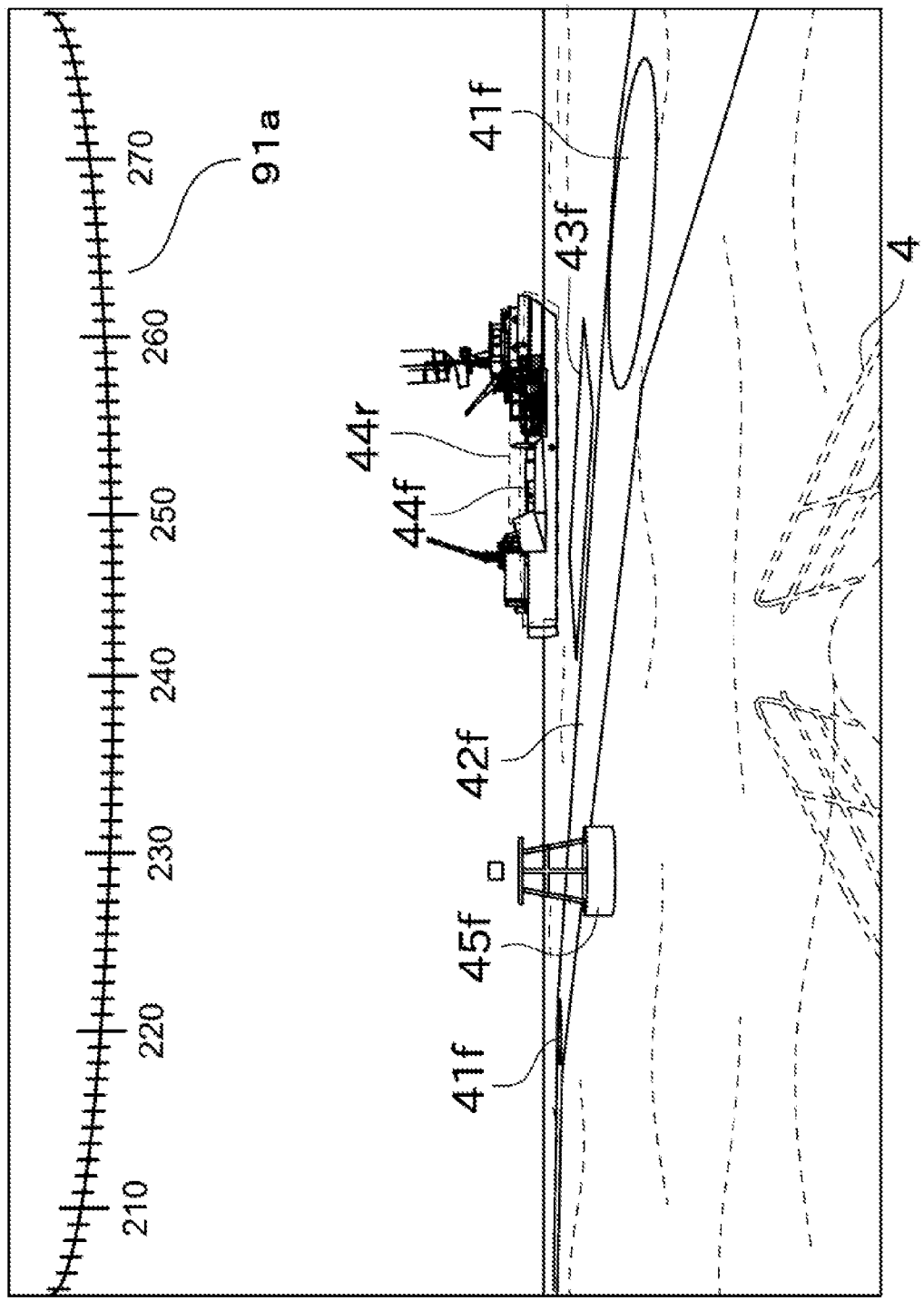
FIG. 12 is Display Example 1 of a direction scale.
Figure 13:
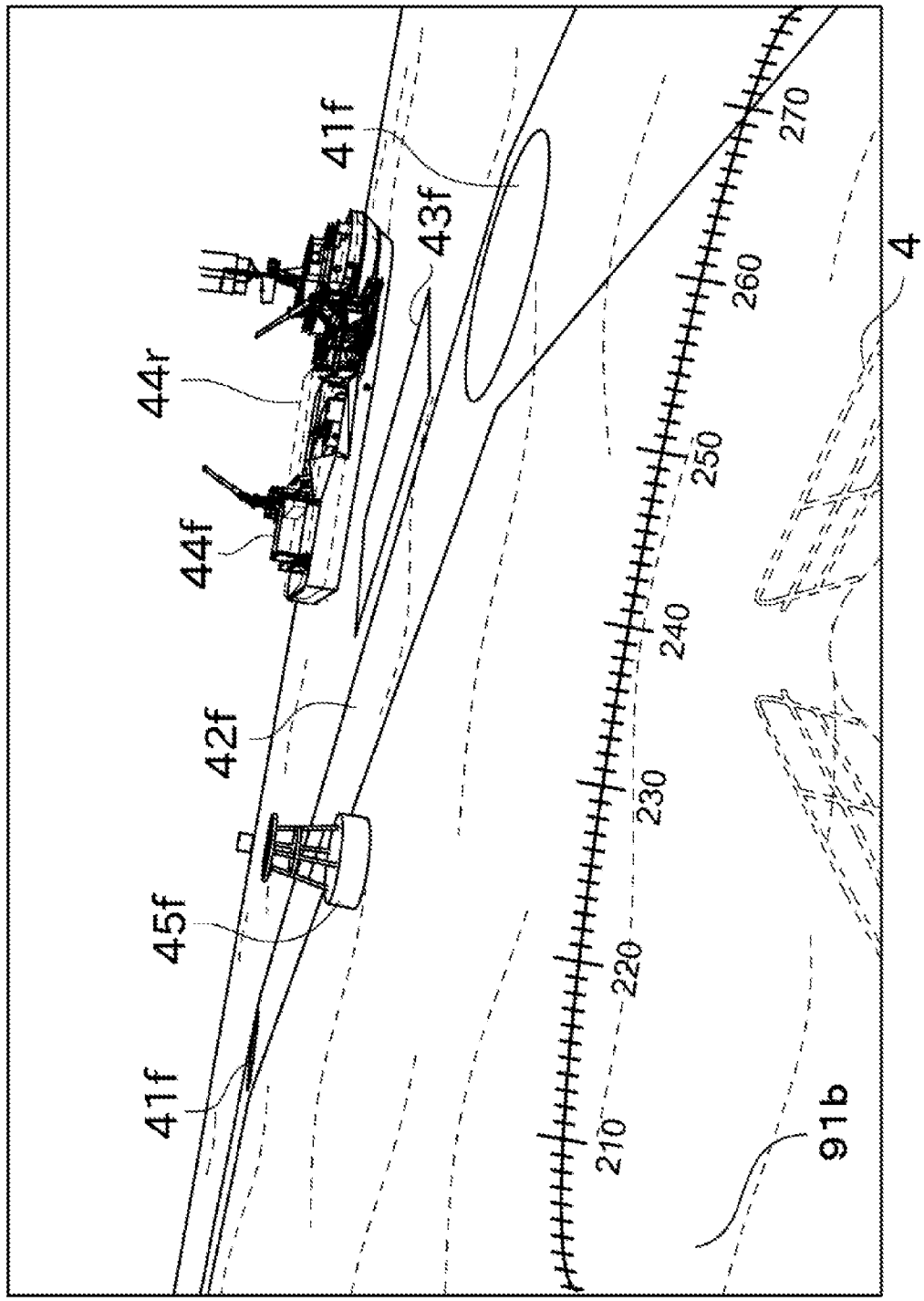
FIG. 13 is Display Example 2 of the direction scale.

When displaying the graphics etc. superimposedly on the image captured by the imaging device as described above, the limited display area can be effectively utilized by simultaneously displaying additional information 91a and 91b, such as the scale images etc. indicative of the direction, as illustrated in FIGS. 12 and 13. At this time, the positions of the additional information may be automatically changed and moved so that the graphics are not hidden by the additional information as much as possible. Moreover, the additional information 91a and 91b may be displayed so as to incline according to the inclination of the hull. By displaying in such a way, exact additional information can always be visually observed even when the hull inclines.

<Terminology>

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Unless otherwise explicitly stated, numbers preceded by a term such as "approximately", "about", and "substantially" as used herein include the recited numbers, and also represent an amount close to the stated amount that still performs a desired function or achieves a desired result. For example, unless otherwise explicitly stated, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. An image generating device, comprising:
   processing circuitry configured to:
      acquire an image captured by an imaging device to be installed in a water-surface movable body;
      acquire positional information indicative of a position of the water-surface movable body;
      acquire posture information indicative of a posture of the water-surface movable body;
      acquire additional display information including information indicative of positions of one or more locations;
      place a virtual camera in a three-dimensional virtual space based on the positional information and the posture information;
      place a virtual projection screen having a three-dimensional shape;
      place at least one of the additional display information on the virtual projection screen into the three-dimensional virtual space as a three-dimensional virtual reality object;
      create a mesh subdividing the virtual projection screen to generate a plurality of mesh faces, the mesh being distorted in the opposite direction of lens distortion caused in the captured image;
      convert vertexes of the virtual reality object and vertexes of the mesh faces by a vertex shader based on a position and a direction of the virtual camera into positions in a two-dimensional virtual screen that is a perspective projection plane;
      place image pieces that are subdivisions of the captured image to the corresponding mesh by a pixel shader based on the positions of the vertexes in the virtual screen; and
      generate a synthesized image where a graphic rendering the virtual reality object is synthesized with the captured image.

2. The image generating device of claim 1, wherein the processing circuitry is further configured to move, when the posture information is changed, the positions and directions of the virtual projection screen and the virtual camera in the three-dimensional virtual space in accordance with changes in the position and the direction of the imaging device.

3. The image generating device of claim 1, wherein at least one of a distorting direction and a distorting amount of the mesh to be created is changeable.

4. The image generating device of claim 1, wherein the mesh is arranged in a curved shape in the three-dimensional virtual space.

5. The image generating device of claim 1, wherein the additional display information includes at least one of an other water-surface movable body, a landmark, a scheduled route, a route trace, a way point, a drop-in location, a destination, an ocean space where a school of fish is detected, a dangerous water area, a traveling prohibited area, a buoy, or a virtual buoy.

6. The image generating device of claim 1, wherein a color of the graphic displayed corresponding to the additional display information is changed according to a distance between a location indicated by the additional display information and the water-surface movable body.

7. The image generating device of claim 1, wherein the synthesized image is outputted to at least one of a display unit, a portable computer, or a head mounted display to be installed in the water-surface movable body.

8. The image generating device of claim 1, wherein the processing circuitry is further configured to generate a scale image indicative of an azimuth, and
a display position of the scale image is determined relative to a display position of the graphic in the synthesized image.

9. The image generating device of claim 2, wherein at least one of a distorting direction and a distorting amount of the mesh to be created is changeable.

10. The image generating device of claim 9, wherein the mesh is arranged in a curved shape in the three-dimensional virtual space.

11. The image generating device of claim 10, wherein the additional display information includes at least one of an other water-surface movable body, a landmark, a scheduled route, a route trace, a way point, a drop-in location, a destination, an ocean space where a school of fish is detected, a dangerous water area, a traveling prohibited area, a buoy, or a virtual buoy.

12. The image generating device of claim 11, wherein a color of the graphic displayed corresponding to the additional display information is changed according to a distance between a location indicated by the additional display information and the water-surface movable body.

13. The image generating device of claim 12, wherein the synthesized image is outputted to at least one of a display unit, a portable computer, or a head mounted display to be installed in the water-surface movable body.

14. The image generating device of claim 13, wherein the processing circuitry is further configured to generate a scale image indicative of an azimuth, and
a display position of the scale image is determined relative to a display position of the graphic in the synthesized image.

15. The image generating device of claim 3, wherein the mesh is arranged in a curved shape in the three-dimensional virtual space.

16. The image generating device of claim 15, wherein the additional display information includes at least one of an other water-surface movable body, a landmark, a scheduled route, a route trace, a way point, a drop-in location, a destination, an ocean space where a school of fish is detected, a dangerous water area, a traveling prohibited area, a buoy, or a virtual buoy.

17. The image generating device of claim 16, wherein a color of the graphic displayed corresponding to the additional display information is changed according to a distance between a location indicated by the additional display information and the water-surface movable body.

18. The image generating device of claim 17, wherein the synthesized image is outputted to at least one of a display unit, a portable computer, or a head mounted display to be installed in the water-surface movable body.

19. The image generating device of claim 4, wherein the additional display information includes at least one of an other water-surface movable body, a landmark, a scheduled route, a route trace, a way point, a drop-in location, a destination, an ocean space where a school of fish is detected, a dangerous water area, a traveling prohibited area, a buoy, or a virtual buoy.

20. A method of generating an image, comprising:
acquiring an image captured by an imaging device to be installed in a water-surface movable body;
acquiring positional information indicative of a position of the water-surface movable body;
acquiring posture information indicative of a posture of the water-surface movable body;
acquiring additional display information including information indicative of positions of one or more locations;
placing a virtual camera in a three-dimensional virtual space based on the positional information and the posture information;
placing a virtual projection screen having a three-dimensional shape;
placing at least one of the additional display information on the virtual projection screen into the three-dimensional virtual space as a three-dimensional virtual reality object;
creating a mesh subdividing the virtual projection screen to generate a plurality of mesh faces, the mesh being distorted in the opposite direction of lens distortion caused in the captured image;
converting vertexes of the virtual reality object and vertexes of the mesh faces by a vertex shader based on a position and a direction of the virtual camera into positions in a two-dimensional virtual screen that is a perspective projection plane;
placing image pieces that are subdivisions of the captured image to the corresponding mesh by a pixel shader based on the positions of the vertexes in the virtual screen; and
generating a synthesized image where a graphic rendering the virtual reality object is synthesized with the captured image.

* * * * *